(12) United States Patent
Hershbarger et al.

(10) Patent No.: US 7,408,996 B2
(45) Date of Patent: Aug. 5, 2008

(54) METHOD AND APPARATUS FOR SYNCHRONIZATION OF DATA IN A TRANSFORMER CIRCUIT

(75) Inventors: Russell Hershbarger, Nevada City, CA (US); Kiyoshi Fukahori, Irvine, CA (US)

(73) Assignee: Teridian Semiconductor Corporation, Irvine, CA (US)

( * ) Notice: Subject to any disclaimer, the term of this patent is extended or adjusted under 35 U.S.C. 154(b) by 0 days.

(21) Appl. No.: 11/476,923

(22) Filed: Jun. 27, 2006

(65) Prior Publication Data

US 2007/0009052 A1   Jan. 11, 2007

Related U.S. Application Data

(63) Continuation-in-part of application No. 10/857,469, filed on May 28, 2004, now Pat. No. 7,158,573.

(60) Provisional application No. 60/695,243, filed on Jun. 28, 2005, provisional application No. 60/474,009, filed on May 29, 2003.

(51) Int. Cl.
*H04B 3/00* (2006.01)

(52) U.S. Cl. .......... 375/258; 375/354; 370/276; 340/310.07

(58) Field of Classification Search .......... 375/257, 375/258, 259, 354, 376; 370/276; 340/310.07
See application file for complete search history.

(56) References Cited

U.S. PATENT DOCUMENTS

2004/0202204 A1* 10/2004 Dong et al. .......... 370/533
2004/0239487 A1* 12/2004 Hershbarger .......... 340/310.07

* cited by examiner

*Primary Examiner*—Temesghen Ghebretinsae
(74) *Attorney, Agent, or Firm*—The Hecker Law Group, PLC

(57) ABSTRACT

A method and apparatus for synchronizing the secondary side to the primary side of a transformer circuit are presented. A preamble which consists primarily of data pulses and inverted power pulses is used initially to obtain the parameters for and to set up a phase locked loop. For example, an edge-triggered one-shot circuit can be used to generate a reference clock from the preamble until lock is detected. Once the phase lock loop locks onto the clock, normal communication between the primary and secondary commences. The phase lock loop, which is in the secondary, is kept in phase during normal communication using valid Manchester edges from the transmit signal.

9 Claims, 20 Drawing Sheets

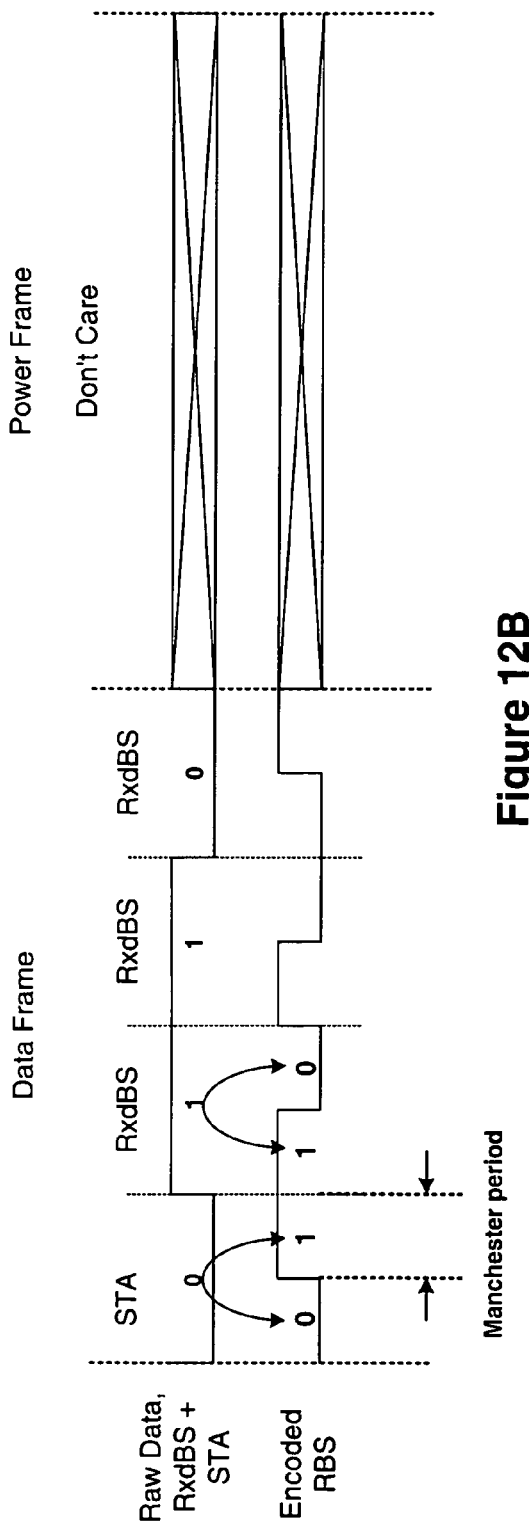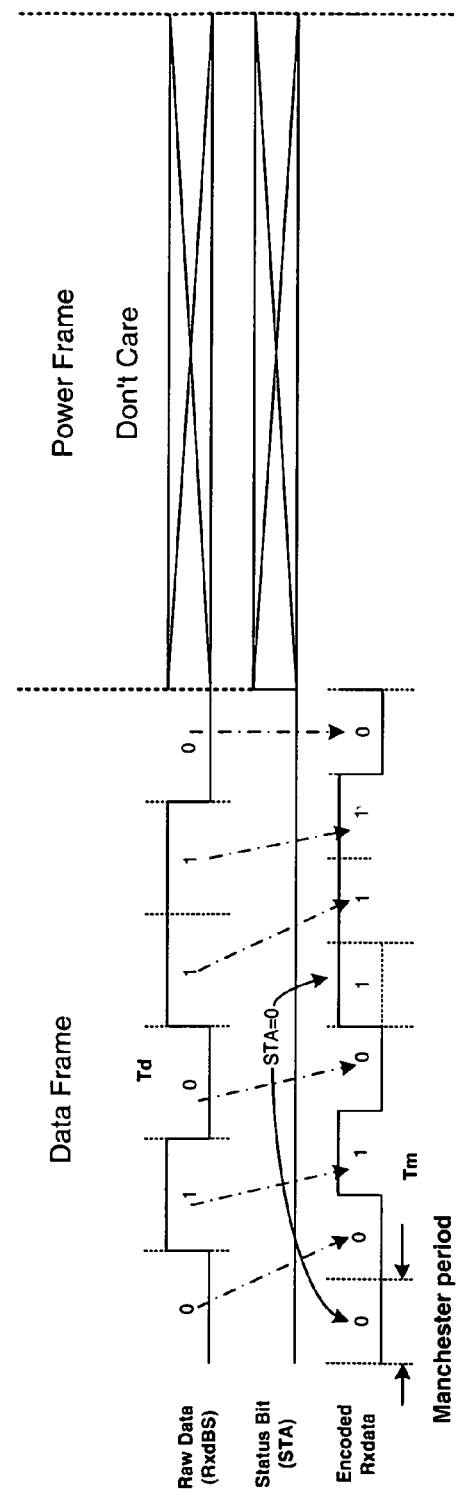

METHOD AND APPARATUS FOR SYNCHRONIZATION OF DATA IN A TRANSFORMER CIRCUIT

CROSS REFERENCE TO RELATED APPLICATIONS

This application claims the benefit of priority from U.S. Provisional Application No. 60/695,243 filed on Jun. 28, 2005, entitled "Method And Apparatus For Cancellation Of Magnetizing Inductance Current In A Transformer Circuit"; and is a continuation-in-part of U.S. patent application Ser. No. 10/857,469, filed on May 28, 2004, entitled "A Method and Apparatus for Full Duplex Signaling Across a Transformer Circuit", which claims the benefit of priority from U.S. Provisional Application No. 60/474,009 filed on May 29, 2003, the specifications of all of which are herein incorporated by reference in their entirety.

BACKGROUND OF INVENTION

1. Field of the Invention

This invention relates to the field of electronic communications. More specifically the invention relates to synchronizing communication between the secondary and primary sides of a transformer circuit used as an isolation barrier.

2. Background

An isolation barrier is generally used in applications in which it is desired to keep voltage potentials in one portion of a circuit isolated from voltages in another portion, e.g., to prevent relatively excessive and/or harmful voltages from entering a relatively low voltage or voltage sensitive circuit. Such applications may include, for example, telephony, medical, industrial, and other similar applications.

For example, in a telephony application, it may be necessary to protect communication circuitry from high voltages on the telephone line by placing an isolation barrier between the communication circuitry and the telephone line. However, while it is desirable to prevent harmful voltages from crossing from one side of an isolation barrier to the other, it is also desirable to facilitate signal communication between circuits on both sides of the barrier. In telephony applications, the isolation requirement is generally imposed by some governmental requirement (e.g., FCC part 68 in the US).

The transformer is one of several types of electrical devices that may be used as an element of an isolation barrier. However, in the prior art, digital communication across a transformer generally requires either a pulse transformer for each direction of communication, or time domain multiplexing of a pulse transformer (i.e., half-duplex communication). Prior art systems are incapable of full-duplex digital communication across a single transformer.

Half-duplex communication reduces communication bandwidth as each direction of communication must wait its turn to use the one-way signal channel. However, the use of multiple transformers to achieve two-way communication is expensive in terms of cost and space. A full duplex, single-transformer solution is therefore desired.

Unfortunately, the electrical characteristics of a transformer make it difficult to simultaneously drive a transmit signal onto, and detect a receive signal from, the same port of a transformer. For example, a transmit voltage signal driven across one port of a transformer gives rise to a load current component and a magnetizing inductance current component. The load current is proportional to the transmit voltage signal divided by the load impedance across the second port of the transformer. The magnetizing current on the other hand is generated by the inductance of the transformer coil being driven, and is proportional to the integral of the transmit voltage signal that appears across the first port of transformer. The value of the magnetizing current is thus dependent upon the history of the transmit signal.

For full-duplex signaling, it would be desirable and advantageous to have a system that can detect a receive signal across the same port of the transformer that is being used simultaneously to drive the transmit signal, in the presence of the load current and magnetizing current associated with the transmit signal.

SUMMARY OF INVENTION

The present invention provides a method and apparatus for synchronizing the primary and secondary sides of a transformer circuit for full-duplex communication.

In one or more embodiments of the invention, the transmit data communicated from the primary to the secondary of the transformer is double DC-balance encoded. With such encoding, the magnetizing current on the primary behaves in a predictable manner, permitting the magnetizing current to be effectively canceled out by a synthesized correction current. As a result, the current sourced by the transmit driver will consist primarily of the load current due to the impedance across the secondary. By modulating the load impedance on the secondary, data may be simultaneously communicated from the secondary to the primary, which may then be detected from the load current flowing into/out of the primary. Timing circuitry is provided on the secondary side of the transformer to synchronize the impedance modulation of receive data sent from the secondary to the primary with the voltage modulation of transmit data sent from the primary to the secondary.

In one embodiment, a method for synchronizing communications comprises sending a preamble sequence having known transitions. The number of transitions occurring in a certain time interval provides a metric for determining an initial control setting in a phase-locked loop (PLL) circuit. The PLL circuit is then activated to lock onto the transitions of the preamble sequence. Once phase lock is achieved, the secondary side circuitry may transmit a lock signal to the primary side circuitry, after which the preamble data may be replaced with real data. In another embodiment, the preamble data is sent for a predetermined period of time, after which phase lock is assumed and real data is transmitted.

In one embodiment, the synchronization apparatus includes a bandgap timer circuit comprising a bandgap-based current source configured to charge a capacitor to a known threshold voltage. During initialization of the communication circuit, the current source is engaged and a counter is simultaneously triggered to count the number of edges detected in the transmitted preamble data. When the charge on the capacitor reaches the threshold voltage, the edge count value is read from the counter. The edge count value provides a metric from which the communication clock frequency may be estimated. The PLL circuit may then be preset to orient the operating range around the estimated clock frequency, e.g., by tuning the center frequency of a controllable oscillator.

One or more embodiments of the invention may implement a one-shot edge detector for detecting the transitions in the preamble data. After phase lock is determined, the PLL may switch from the one-shot edge detector to a timing recovery detector configured to select valid transition edges of Manchester encoded data.

BRIEF DESCRIPTION OF THE DRAWINGS

FIG. 12A is a signal diagram illustrating encoding of receive data in accordance with an embodiment of the present invention.

FIG. 12B is a signal diagram illustrating encoding of receive data in accordance with another embodiment of the present invention.

DETAILED DESCRIPTION

A method and apparatus for synchronizing the secondary side to the primary side of a transformer circuit for full duplex communication are described. In the following description, numerous specific details are set forth to provide a more thorough description of embodiments of the invention. It will be apparent, however, to one skilled in the art that the invention may be practiced without these specific details. In other instances, well known features have not been described in detail so as not to obscure the invention.

Embodiments of the present invention may be used in electronic circuits to support simultaneous, bi-directional communication across a transformer, for example, in connection with an isolation barrier. Signal communication across an isolation barrier is generally useful for telephony, medical, industrial, and other applications wherein it is desired to separate voltage potentials. In telephony applications, the isolation requirement is generally imposed by some governmental requirement (e.g. FCC part 68 in the US). Although the discussions herein are concentrated on telephony applications, it should be apparent to those of skill in the art that the principles expounded herein are applicable to other applications wherein timing synchronization is desired.

Implementation Example: DAA Embodiment

Signal communication across an isolation barrier is generally useful for telephony, medical, industrial, and other applications wherein it is desired to separate voltage potentials. In telephony applications, communication devices (e.g., computers, fax machines, etc.) typically connect to the PSTN (public switched telephone network) through modem devices to send and receive signals over the telephone lines.

A DAA circuit (data access arrangement) provides the interface between the modem device and the telephone lines, including the isolation barrier. The DAA may be described in terms of a "line side" (i.e., that portion of the circuitry that couples to the telephone line), a "host side" (i.e., that portion of the circuitry more closely associated with the host device; also referred to as the "modem side" or "DSP side"), and an isolation barrier that separates the line side and the host side. The isolation barrier may include one or more isolation elements, as well as one or more isolation element types (e.g., transformers, capacitors, optical couplers, etc.).

Figure 1:
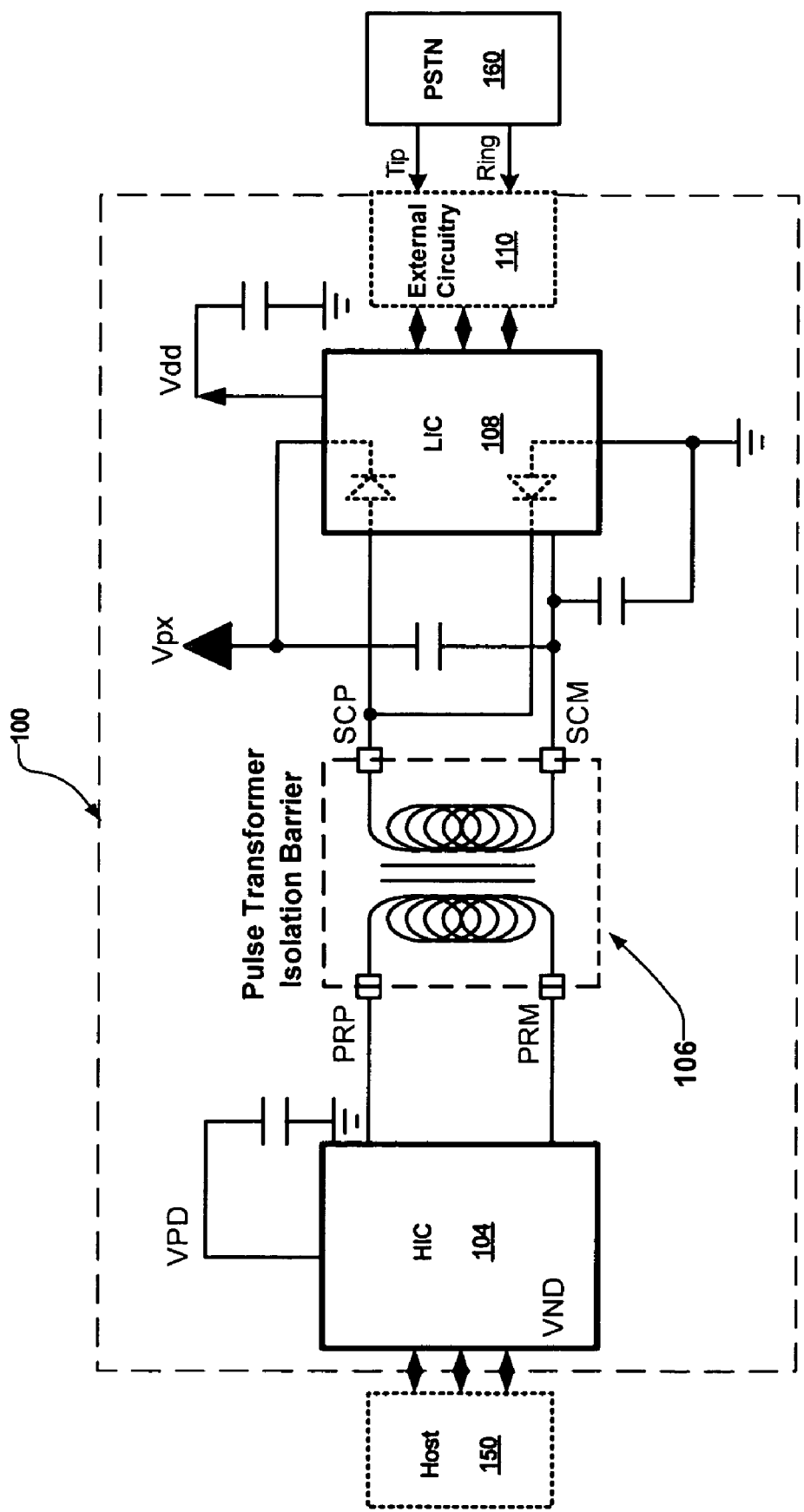
FIG. 1 is block diagram of a modem codec DAA (data access arrangement) connecting a host/DSP to a public switched telephone network in accordance with an embodiment of the present invention.

FIG. 1 is a block diagram of one embodiment of a modem DAA connecting a host/DSP to a PSTN. In this illustration, DAA 100 connects Host Computer 150 to PSTN 160 via the "tip" and "ring" lines of the telephone network. DAA 100 comprises Host Interface Component (HIC) 104; Isolation Barrier 106; Line Interface Component (LIC) 108; and external circuitry 110. HIC 104 interfaces the DAA functions with Host 150. Host 150 may include, for example, a DSP, personal computer, or similar device.

External circuitry 110 provides circuitry for connection of the DAA to PSTN 160. Typically, the PSTN signal is analog in nature. The analog information from the PSTN may be converted to digital information in LIC 108 before transmission across Isolation Barrier 106 to HIC 104. In one embodiment, Isolation Barrier 106 comprises a pulse transformer.

In telephony applications, analog voice band signals (e.g., 300 Hz-3.6 KHz) on the phone line may be converted to digital data in LIC 108 using a suitable modulation/demodulation technique (e.g., at the rate of 1.536 Mbps for an 8 kHz sampling rate). The generated digital data may be further processed and/or directly time-division multiplexed with status and other information to form an effective transfer rate that may be higher than the bit rate of the digital data being sent across the transformer of Isolation Barrier 106. HIC 104 may subsequently demultiplex the received bit stream into the various components, e.g., voice band signal, status, and other information. HIC 104 may digitally filter the voice band signal, decimate and demodulate the voice band signal to extract the original voice band information, and then send the extracted digital voice band data (e.g., in 16-bit samples) to Host 150.

In the other direction (i.e., transmission from Host 150 to PSTN 160), HIC 104 may receive digital information from Host 150 for transmission to PSTN 160. HIC 104 may receive the digital information in the form of a digital data stream or other form (e.g., 16-bit data at 16 kHz) from Host 150 and may serialize it via a parallel-to-serial converter (or an appropriate modulation technique) to a bit stream of appropriate rate (such as, but not limited to, 256 kbps or 1.536 Mbps). In accordance with one or more embodiments of the invention, an encoding scheme may be used to maintain DC-balanced current and voltage characteristics within the signal driven across the transformer of Barrier 106, thus raising the actual data transfer rate across the barrier to the full transfer speed (such as, but not limited to, 512 kbps or 2.048 Mbps). The digital bit stream is then received by LIC 108.

Communication across Isolation Barrier 106 may be performed in full-duplex. In addition to the data communicated across the barrier, control and clocking information, as well as power may be sent across the barrier. For instance, clocking information used to reconstruct the HIC clock in LIC 108 may be embedded in the bit stream sent across the barrier from HIC 104.

In one embodiment of the DAA circuit, HIC 104 may provide power needed by LIC 108 while the phone line connection is "on-hook." However, after the phone line connection goes "off-hook," LIC 108 may be entirely line powered, if power is available from the telephone line.

A serial data port may be provided for transferring "receive" data and status information from HIC 104 to Host 150 and "transmit" data and control information from Host 150 to HIC 104. As used herein, "receive" data is data sent from the line side to the host side and "transmit" data is data sent from the host side to the line side.

In the descriptions that follow, the primary side of transformer 106 is connected to HIC 104 and the secondary side of transformer 106 is connected to the LIC 108 for consistency in description. It should be apparent to those of skill in the art that other arrangements are also possible. In addition, "forward direction" refers to data and control bits driven onto the primary by the HIC drivers. Clocking and power may also be provided in the forward direction. The "reverse direction" is data received by HIC 104 from across Barrier 106.

Pulse transformer 106 may have, for example, a 1:1 (PRI: SEC) winding ratio. However, it should be apparent to those of skill in the art that the transformer ratio is in no way constrained to those discussed herein.

The pulse transformer has advantages over other types of isolation elements. For instance, advantages of a pulse transformer over a capacitor as the isolation element include lower cost Bill of Materials (BOM); lower component count; and better common mode noise immunity. In addition, it may be easier to send power across a transformer with minimum loss (e.g., HIC 104 sending power across to LIC 108) while the phone line connection is "on-hook."

Figure 2:
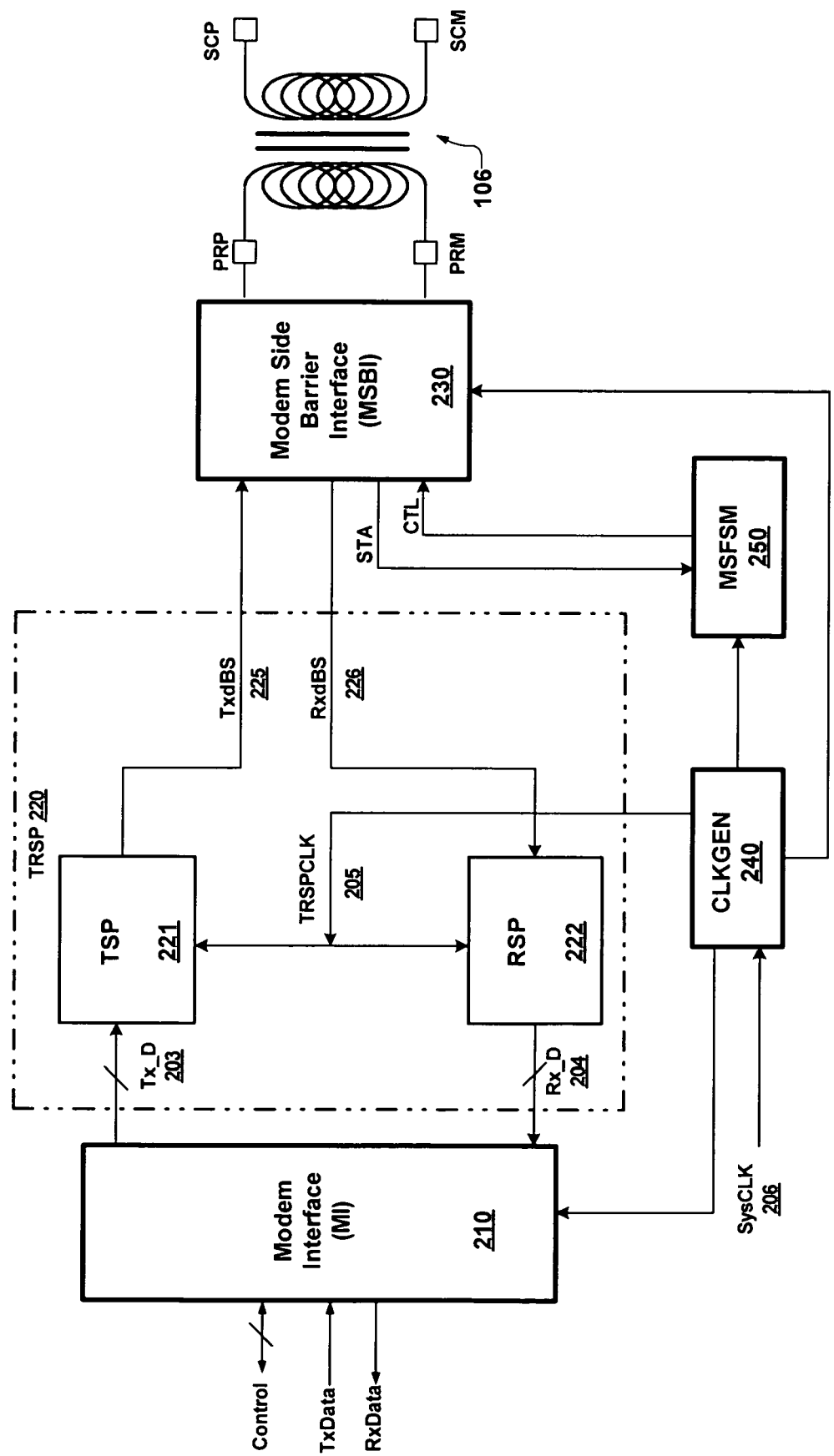
FIG. 2 is a block diagram of a host interface component in accordance with an embodiment of the present invention.

FIG. 2 is a block diagram of an embodiment of Host Interface Component 104. In the illustrated embodiment, HIC 104 may include, for example, Modem Interface (MI) 210; Transmit and Receive Signal Processors (TSP 221 and RSP 222); Modem Side Barrier Interface circuit (MSBI) 230; Modem Side Barrier Interface Finite State Machine (MSFSM) 250; and Clock Generation Circuit (CLKGEN) 240.

MI 210 may provide a bi-directional data port that can be configured to support most DSP's or similar processing units with which it may interface. MI 210 provides an interface between host 150 and DAA 100. In the present illustration, only representative interface signals are shown.

Signals Tx_D 203 and Rx_D 204 may be configured as internal signals of a predetermined width (e.g., 16 bits wide). In this illustration, Tx_D 203 is input to Transmit Signal Processor (TSP) module 221 and Rx_D 204 is output from Receive Signal Processor (RSP) 222. In addition, clock signals TRSPCLK 205 provides clocking for module TSP 221 and module RSP 222. In addition, clocks to MSFSM 250 and MSBI 230 may be derived within CLKGEN 240 from the system clock (SysCLK 206).

TSP 221 receives digital data, Tx_D 203, from MI 210, processes the digital data, and may serialize it via a simple parallel to serial converter or through an over-sampling quantizer (e.g., digital sigma-delta modulator) to generate transmit bit stream TxdBS 225, which is coupled to MSBI 230 for transmission over the barrier. The present invention is in no way limited in the mechanism by which the one-bit data stream TxdBS originates.

In one or more embodiments, TSP 221 may consist of a transmit interpolation filter (TIF), which takes in data from MI 210 at a certain rate (e.g., 16-bits at 8 kHz), and either a parallel to serial converter or a digital sigma-delta modulator. The TIF may up-sample (i.e., interpolate) the data to a desired rate (e.g., 16 kHz), and output a 16-bit (or other multi-bit) data stream. This 16-bit data stream may be immediately serialized and sent to MSBI 230 for transmission or, alternately fed to a digital sigma-delta modulator and thus converted to a serialized bit stream for transmission. The former has the advantage of reduced data rate across the barrier; however, any serialization method may be employed without departing from the spirit of the invention.

The serialized output TxdBS 225 from either the parallel to serial converter or a digital sigma-delta modulator (DSDM) is fed into MSBI 230 for time-division multiplexing with control data to form a transmit bit stream (TBS), which, in one or more embodiments, is double-balance encoded (e.g., DC-balanced with respect to current and voltage drive to the transformer) prior to transmission across the barrier to LIC 108.

In the receive direction, information that is transferred over the barrier (e.g., using impedance modulation) from the LIC 108 to MSBI 230 is decoded and separated into data and status in MSBI 230. The data portion (RxdBS 226) may be first serial to parallel converted to an appropriate word width (e.g., 17 bits at 16 kHz) and/or directly fed to one or more digital filters within RSP 222. The digital filters may be synchronized so that there is one sample available at the desired output rate (e.g., 16 kHz).

The output of RSP 222, Rx_D 204, may be decimated output data (e.g. 16-bit wide) at the desired rate (e.g., 8 kHz). Rx_D 204 may then be transmitted to MI 210 for subsequent processing and transmission to Host 150.

MSBI 230 provides the interface functionality of the HIC with the isolation barrier for communication with LIC 108. In one or more embodiments, in addition to other functions, the MSBI 230 may manage all of the required signaling across the barrier by, for example: encoding the transmit bit stream (TxdBS 225) and control information (CTL) and transferring the encoded signal across the barrier; decoding the receive bit stream (RxdBS 226) and status information (STA) from LIC 108; and generating proper amplitude pulses to transfer power to LIC 108 when necessary. The MSFSM 250 is a state machine that controls the functions of MSBI 230 and generates the control signal, CTL, that is transferred across the barrier to LIC 108.

Figure 9:
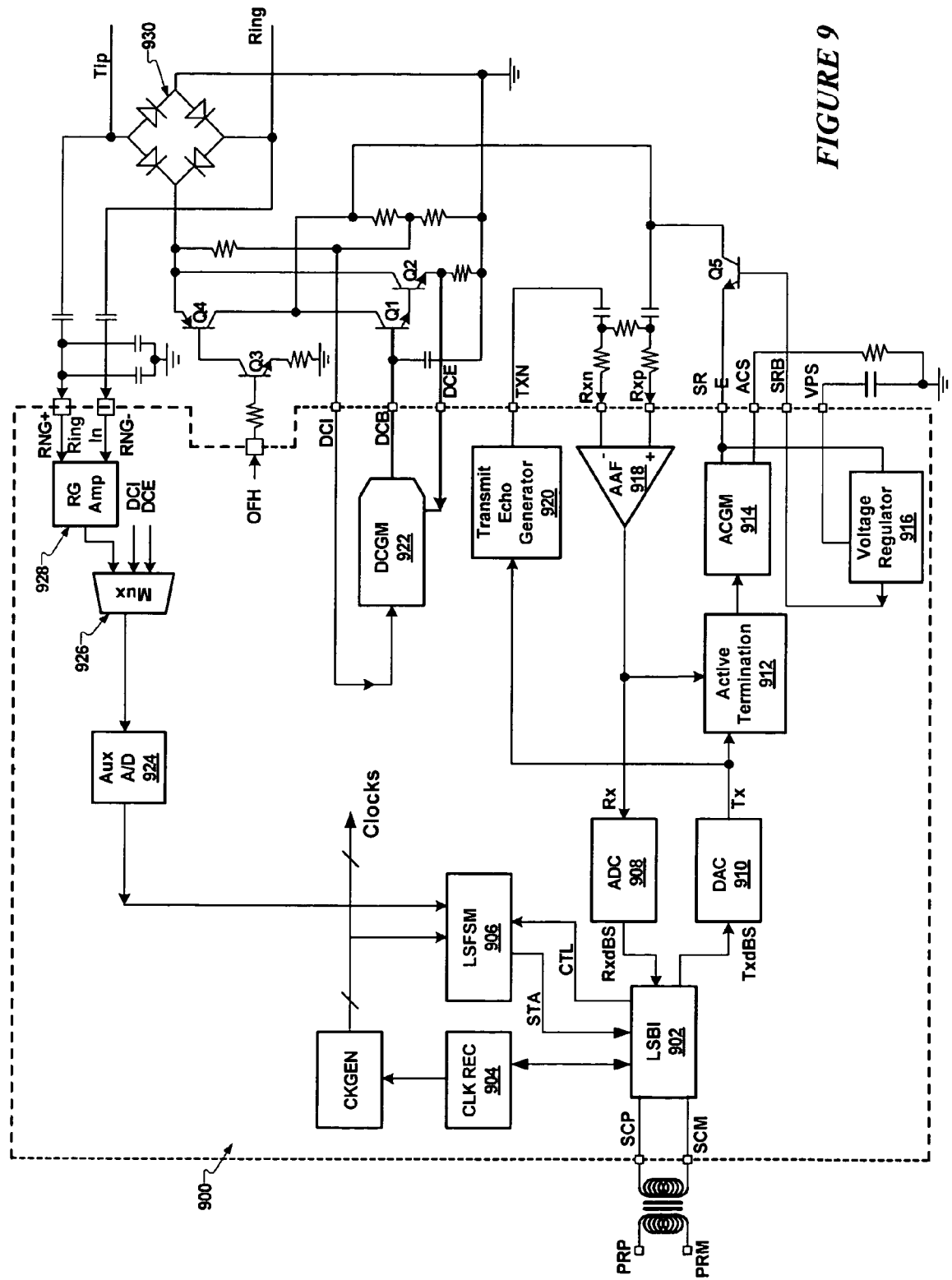
FIG. 9 is a block diagram of a line interface component in accordance with an embodiment of the present invention.

Referring back to FIG. 1, the telephone line side of the DAA embodiment comprises LIC 108 and external circuitry 110. The functionality of LIC 108 and external circuitry 110 of one possible embodiment are further illustrated in FIG. 9. As illustrated, LIC 108 comprises circuitry enclosed in block 900. Other circuitry (not shown) may also be part of the external circuitry 110.

LIC 108 comprises Line Side Barrier Interface (LSBI) 902; Clock Recovery circuit (CLK REC) 904; Line Side Finite State Machine (LSFSM) 906; Analog-to-Digital Converter block (ADC) 908; Digital-to-Analog Converter block (DAC) 910; Active Termination circuit 912; AC Transmit Driver (ACGM) 914; Voltage Regulator 916; Anti-Aliasing Filter (AAF) 918; Transmit Echo Generator 920; DC Termination Circuit (DCGM) 922; Auxiliary Analog-to-Digital Converter (Aux A/D) 924; Multiplexer 926; and Ring Amplifier (RG Amp) 928.

In one embodiment, the analog signal from the telephone line (Tip and Ring) is conditioned through Rectifier 930 to eliminate any polarity issues.

The positive terminal of Rectifier 930 is AC coupled through the Rxp input of block 900 to the positive terminal of AAF 918. The negative terminal, Rxn, of AAF 918 is AC coupled to output TXN of Transmit Echo Generator 920 for transmit echo cancellation.

AAF 918 sums the receive signal, Rxp, with a portion of transmit signal, TXN, to reduce the transmit signal component in the receive path.

The analog output, Rx, of AAF 918 is coupled to ADC 908 for conversion to the receive data bit stream, RxdBS. The resulting high frequency one-bit receive data stream (RxdBS) may be sent to LSBI 902 for encoding and eventual transmission across the barrier to HIC 104, or alternately be further filtered by an additional digital filter, then serialized and sent to LSBI 902 for transmission across the barrier.

DCGM 922 provides for appropriate DC termination characteristics by monitoring the input voltage from the telephone line (DCI), and the DC loop current sense (DCE).

In the transmit direction, the transmit bit stream (TBS) received from across the barrier by LSBI 902 is first separated into transmit data bit stream (TxdBS) and control data (CTL). The transmit bit stream TxdBS may be converted to the analog transmit signal Tx using devices such as: a serial to parallel converter and digital filter (e.g., digital sigma-delta modulation); or a Digital to Analog Converter block (e.g. DAC 910). The received signal from AAF 918 (e.g., Rx) is summed with the transmit signal in Active Termination block 912. AC termination is provided by sensing the receive signal at terminal Rxp and feeding back an appropriate AC current generated within Active Termination Circuit 912 via AC Transmit Driver 914 to the collector of transistor Q5.

In one or more embodiments, an auxiliary analog to digital converter, Aux A/D 924, may be used to convey status information associated with the line condition. The tip and ring inputs may be coupled as differential inputs to amplifier 928 and then multiplexed with the line sensing signals, DCI and DCE, for conversion in Aux A/D 924. The output of Aux A/D 924 may then be coupled to Line Side Finite State Machine (LSFSM) 906 for transmission to HIC 104 as a status (STA) component of the receive signal. The host (i.e., host 150) in communication with HIC 104 receives and interprets the status data to decide the appropriate action in controlling the DAA device.

Full-Duplex Signaling Over the Transformer

To understand the functions of MSBI 230 and LSBI 902, it is useful to discuss the general concept of transferring data bi-directionally and simultaneously (i.e., full duplex) across the isolation barrier in accordance with one or more embodiments of the present invention.

Figure 3A:
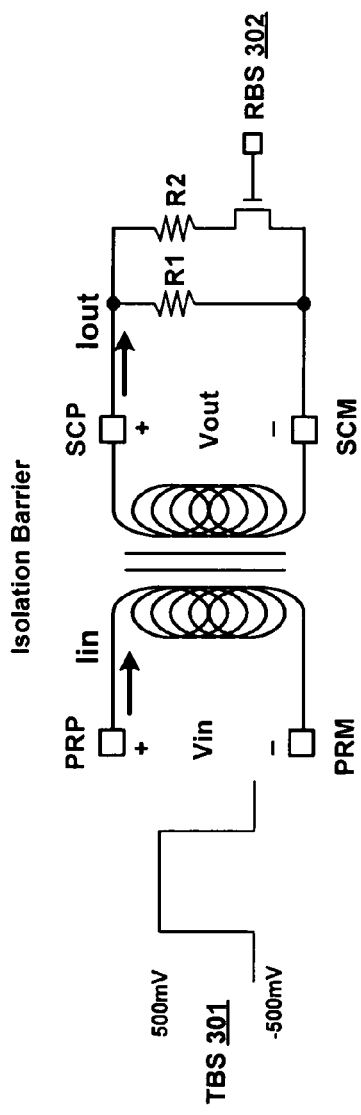
FIG. 3A is a circuit diagram of a transformer drive scheme in accordance with an embodiment of the present invention.
Figure 3B:
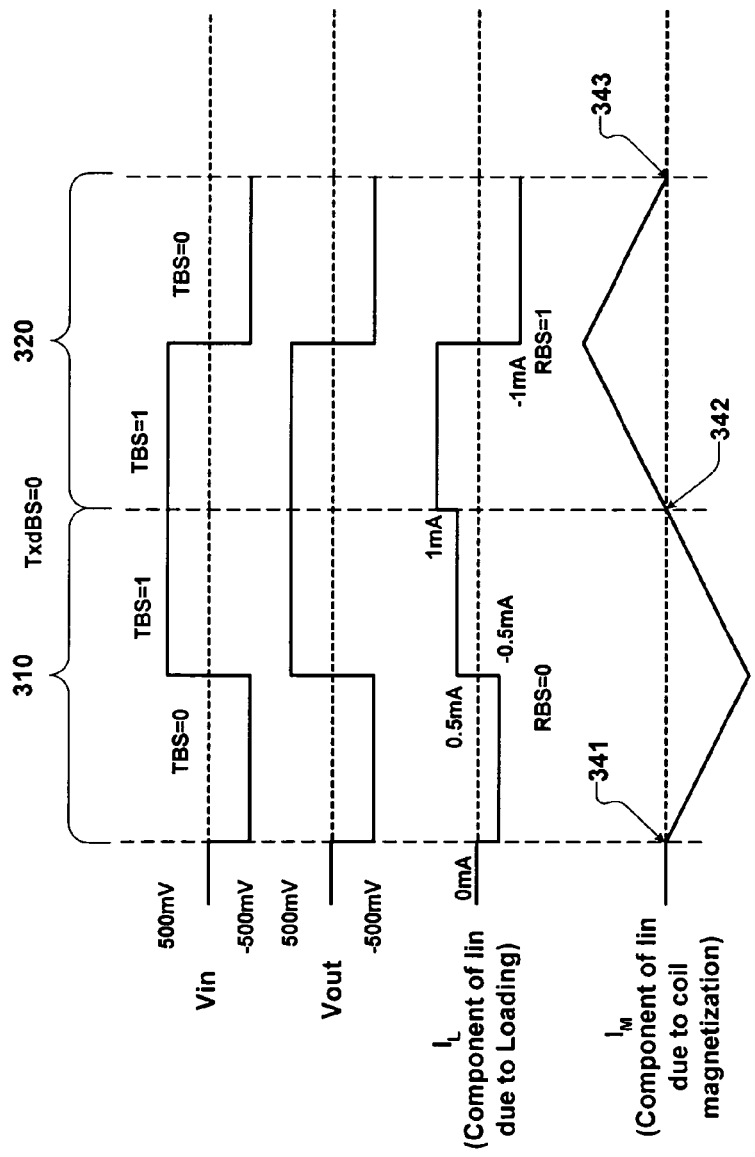
FIG. 3B is a signal diagram of the circuit of FIG. 3A, in accordance with an embodiment of the present invention.

FIGS. 3A and 3B provide illustration of the basic concept involved in the bi-directional transfer of data across a pulse transformer. FIG. 3A is an illustration of a transformer drive scheme in accordance with an embodiment of the present invention. FIG. 3B shows the transformer voltage and current values Vin, Vout, and Iin when input data TxdBS="0" is doubly DC balanced via Manchester encoding to yield "0110" TBS (first stage Manchester encoding: "0" becomes "01"; second stage Manchester encoding: "01" becomes "0110") and the receive data RBS transitions from "0" to "1" at the midpoint of the data period. In this illustration, PRP and PRM are the positive and negative terminals on the primary side of the pulse transformer, respectively. Similarly, SCP and SCM are the positive and negative terminals on the secondary side of the pulse transformer, respectively.

In operation, transmit data, in the form of input voltage Vin, is driven across the primary side of the transformer. Assuming a 1:1 winding ratio (though other winding ratios may be used as well), mutual inductance causes the input voltage to be induced across the output terminals of the secondary as Vout. As a consequence, output current Iout flows through the loading resistor R1 (e.g., 1 k$\Omega$), assuming the switch on R2 is open (i.e., off). Since magnetic flux in a transformer cannot change immediately, input current Iin will flow into the primary side simultaneously.

By turning on the switch controlled by RBS 302 (see portion of waveforms in FIG. 3B labeled 320), and hence placing resistor R2 in parallel with resistor R1, the load impedance changes to the equivalent impedance of two resistors in parallel. For example, if R1 and R2 are each 1 k$\Omega$, then the equivalent impedance is 0.5 k$\Omega$. Load-dependent components of Iout and Iin also change as the impedance changes. For instance, if the load current, $I_L$, is 0.5 milliamps when driven by +0.5 v across the primary ports with only R1 as the load impedance, then the load current will double to 1.0 milliamps when R2 is switched on (given R1=R2=1 k$\Omega$). Thus, if the load-dependent portion of Iin could be separated out from the total current Iin, it would form a basis for detecting the impedance changes on the primary side of the barrier and extracting the receive data (RBS 302) responsible for those changes (i.e., by controlling the switch).

In operation, Iin is composed of a magnetizing inductance component and a load current component. For detection of impedance modulation, it is possible to isolate the component of Iin due to load impedance, $I_L$, from the component of Iin due to the magnetizing inductance, $I_M$. One or more embodiments of the invention facilitate isolation of the loading current from the magnetizing current by using a transmit data encoding scheme that is double DC balanced, i.e., balanced in both current and voltage. Double DC-balancing of the transmission signal induces predictable behavior in the magnetizing inductance current, such that the magnetizing inductance current is near zero at specific times. For example, in FIG. 3B, $I_M$ approaches zero value at points 341, 342 and 343 (e.g., at the end of each double-balanced data period).

Figure 4:
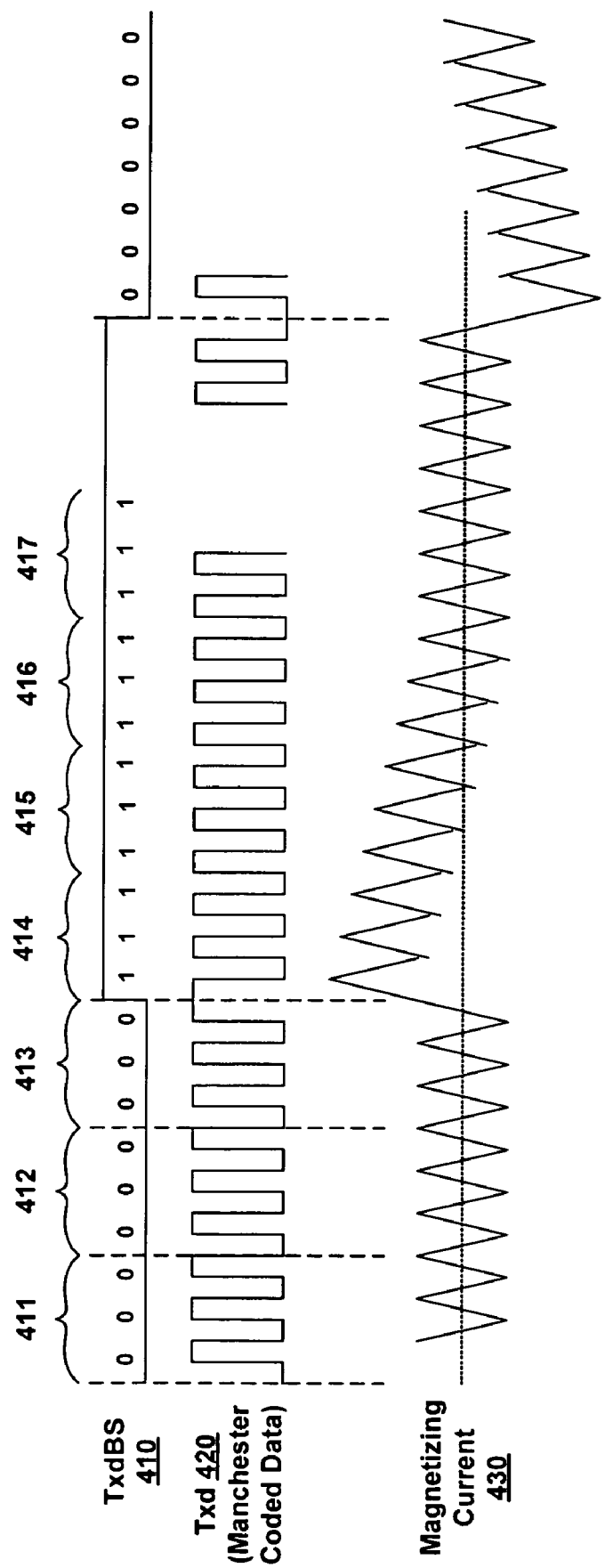
FIG. 4 is a signal diagram illustrating the effect of a single-balanced data signal (e.g., by 1-bit to 2-bit Manchester encoder) on magnetizing current.

FIG. 4 provides an example of a transmit data stream that is not double-balanced, with the corresponding magnetizing current. In this example, transmit data TxdBS 410 is Manchester encoded (single balanced) to generate coded data Txd 420, which is driven across a transformer. In this illustration, the magnetizing current 430 at the end of each of the Manchester periods is affected by the change in data pattern and may vary from one Manchester period to the next as shown. For example, at the transition from data sequence 413 to data sequence 414, the magnetizing current, because of its integrating behavior, rises well above the DC balance point for current. The perturbation in DC current value decays toward zero over time until perturbed again by another non-double-balanced data sequence. This makes the process of isolating load current from magnetizing current more difficult because the value of the magnetizing current is unpredictable.

To make magnetizing current predictable, the transmit signal may be doubly DC balanced prior to transmission across the transformer. Balancing the transmit data signal in both current and voltage may be established, for example, by applying multiple single-balanced encoding processes to the transmit data (in sequence or otherwise). For example, Manchester encoding (i.e., 1b/2b) applied twice to the transmit signal will result in a double-balanced data stream. In other embodiments, a single encoding process may be implemented that provides DC balancing of both current and voltage characteristics. The benefit of this encoding is that the magnetizing current, $I_M$, returns to zero at the end of every Manchester period.

In accordance with one embodiment of the invention, this facilitates detection of the load current, $I_L$, by sampling Iin at specific points in time when $I_M$ is near zero (e.g., near the transition between each Manchester period).

In accordance with another embodiment of the invention, the predictable nature of magnetizing current $I_M$ allows for generation of a corresponding cancellation current at the primary of the transformer, such that the load-dependent current $I_L$ may be sampled substantially free of the influence of the magnetizing inductance current.

The impact of specific balancing block codes on transmission bandwidth, circuit complexity, and decay time of the encoded signal may be considered in selecting a particular encoding scheme. For instance, using two Manchester encoders (1-bit to 2-bit encoding) in series would result in a bandwidth of four times the original transmission bandwidth. In contrast, using a 7b/8b (i.e., 7-bit to 8-bit) encoder would be more bandwidth efficient, but may result in an unnecessarily complex circuit. In one or more embodiments of the present invention, a DC balanced 3b/4b encoder or a Manchester encoder is applied in series with another Manchester encoder to provide predictable magnetizing current with relatively moderate increases in bandwidth.

Figure 5A:
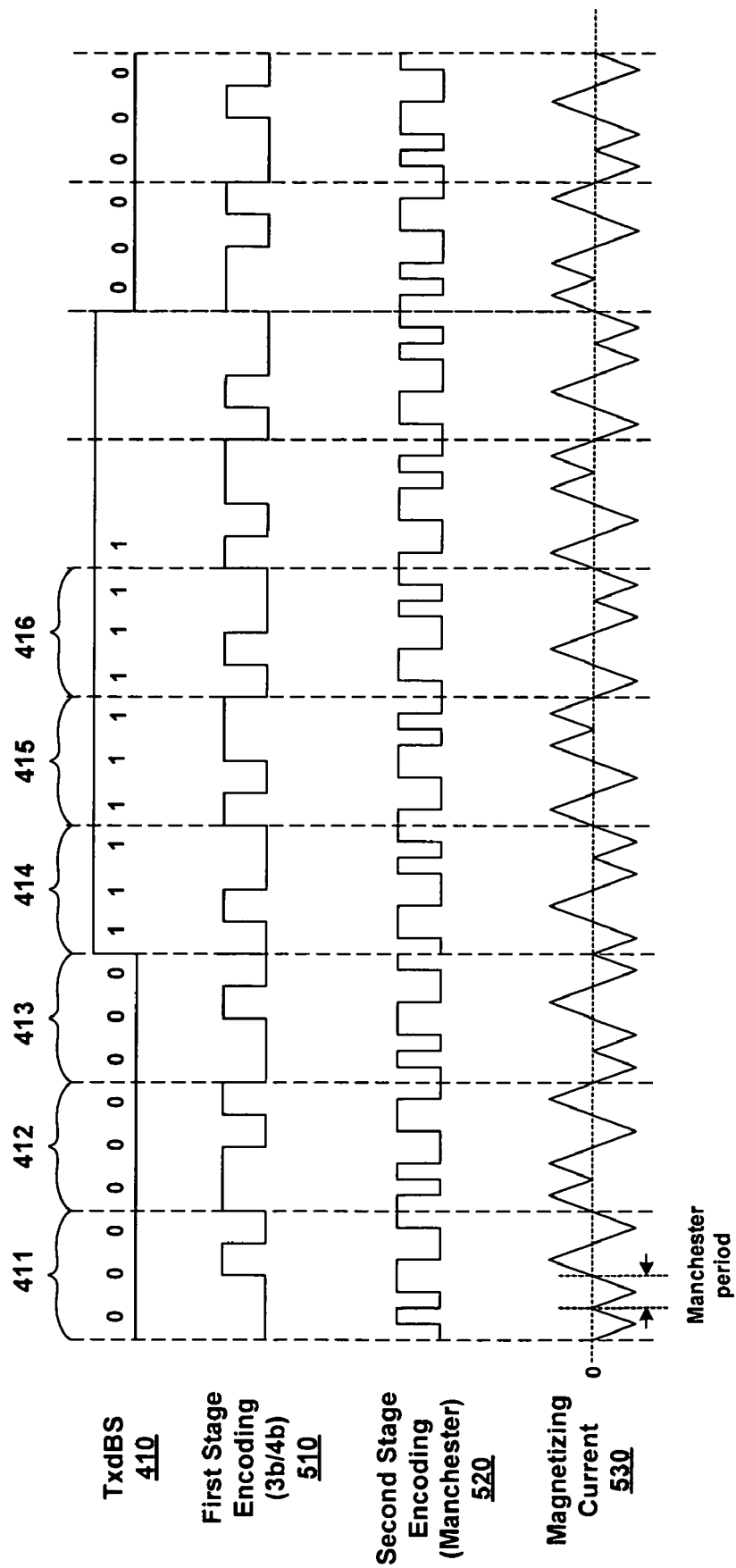
FIG. 5A is a signal diagram illustrating the behavior of the magnetizing current after transmit data is first processed through a 3-bit to 4-bit encoder followed by a final Manchester encoder in accordance with an embodiment of the present invention.

FIG. 5A is an illustration of the behavior of the magnetizing current after TxdBS 410 is processed through a 3-bit to 4-bit encoder in accordance with an embodiment of the present invention. In this illustration, a DC-balanced 3-bit to 4-bit encoding scheme is used in the first stage (i.e., waveform 510), followed by a Manchester encoding second stage (i.e., waveform 520). This combination of encoding schemes results in the magnetizing current shown in waveform 530, which returns to zero at the end of each Manchester period.

A 4-bit data scheme has only six code words available that are DC balanced as follows: "0011"; "0101"; "0110"; "1001"; "1010"; and "1100". Thus, in the 3-bit to 4-bit encoding scheme of an embodiment of the present invention, these six balanced code words are assigned the values from one ("001") through six ("110") of the three input bit combinations. The remaining two input words, zero ("000") and seven ("111") are encoded to alternate between two unbalanced 4 bit words that average to DC-balanced words, e.g., "000" may be encoded to alternate between "0010" and "1101", while "111" may be encoded to alternate between "0100" and "1011".

Figure 5B:
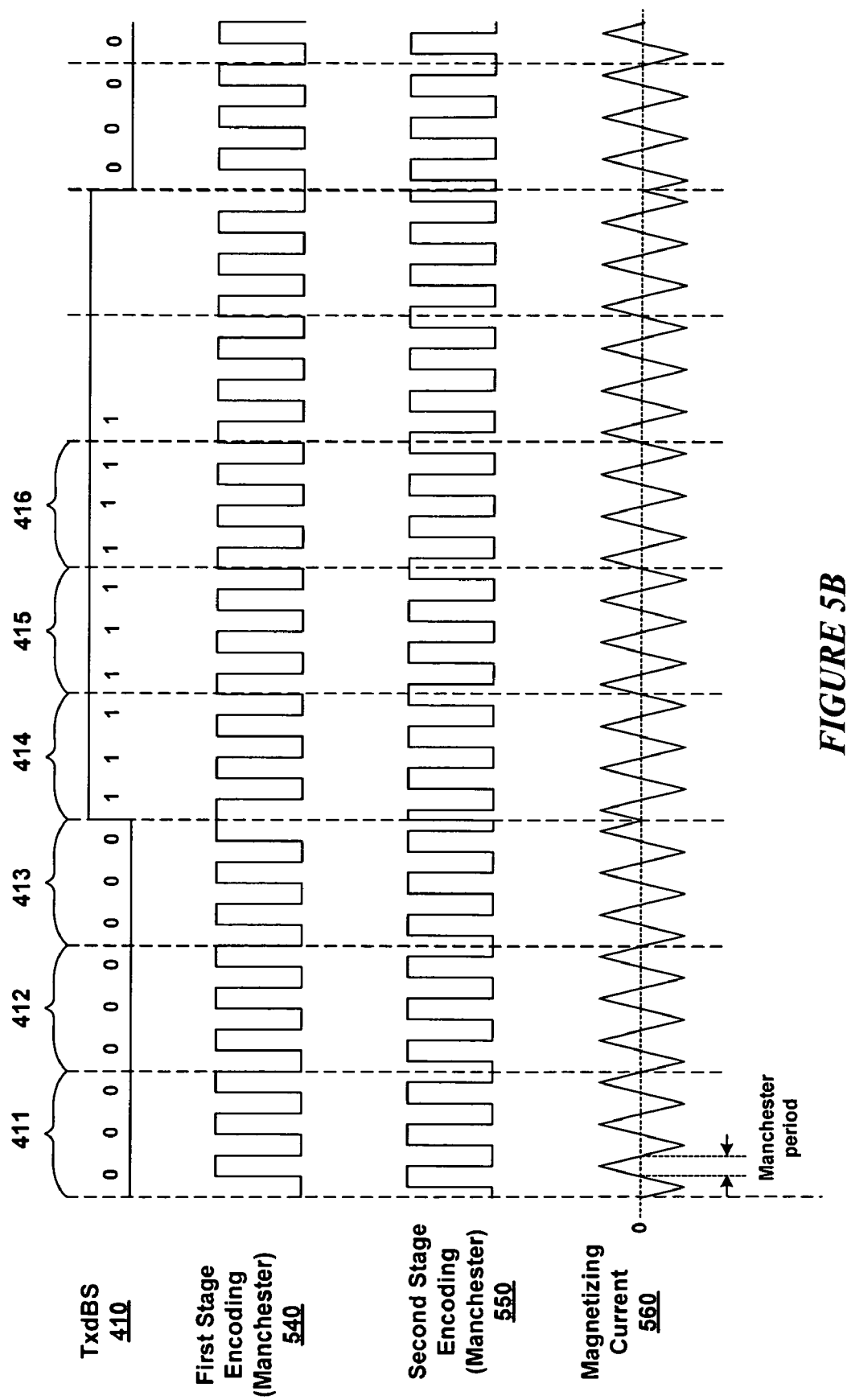
FIG. 5B is a signal diagram illustrating the behavior of the magnetizing current after transmit data is first processed through a first Manchester encoder (1b/2b) followed by a second Manchester encoder in accordance with an embodiment of the present invention.

FIG. 5B is an illustration of the behavior of the magnetizing current in another embodiment after TxdBS 410 is processed through two layers of Manchester encoding. In this illustration, a DC-balanced 1-bit to 2-bit encoding scheme is used in the first stage see waveform 540), followed by a Manchester second stage (see waveform 550). As in the 3b/4b case, the magnetizing current is predictably zero at the end of each Manchester period independent of the raw transmit data values, as shown in waveform 560.

As the waveforms illustrate, the double Manchester encoding of transmit data to a double DC balanced signal 550 results in a balanced and predictable magnetizing current 560—i.e., zero at the end of each Manchester period. Thus the transformer input current Iin sampled at the end of every Manchester period will ideally be equal to $I_L$, the load current. Because load current can be detected by sampling the primary side current, Iin, at prescribed times, it is possible, in one or more embodiments of the invention, to communicate receive data using modulation of load impedance on the secondary of the transformer.

Modem Side Barrier Interface

Figure 6:
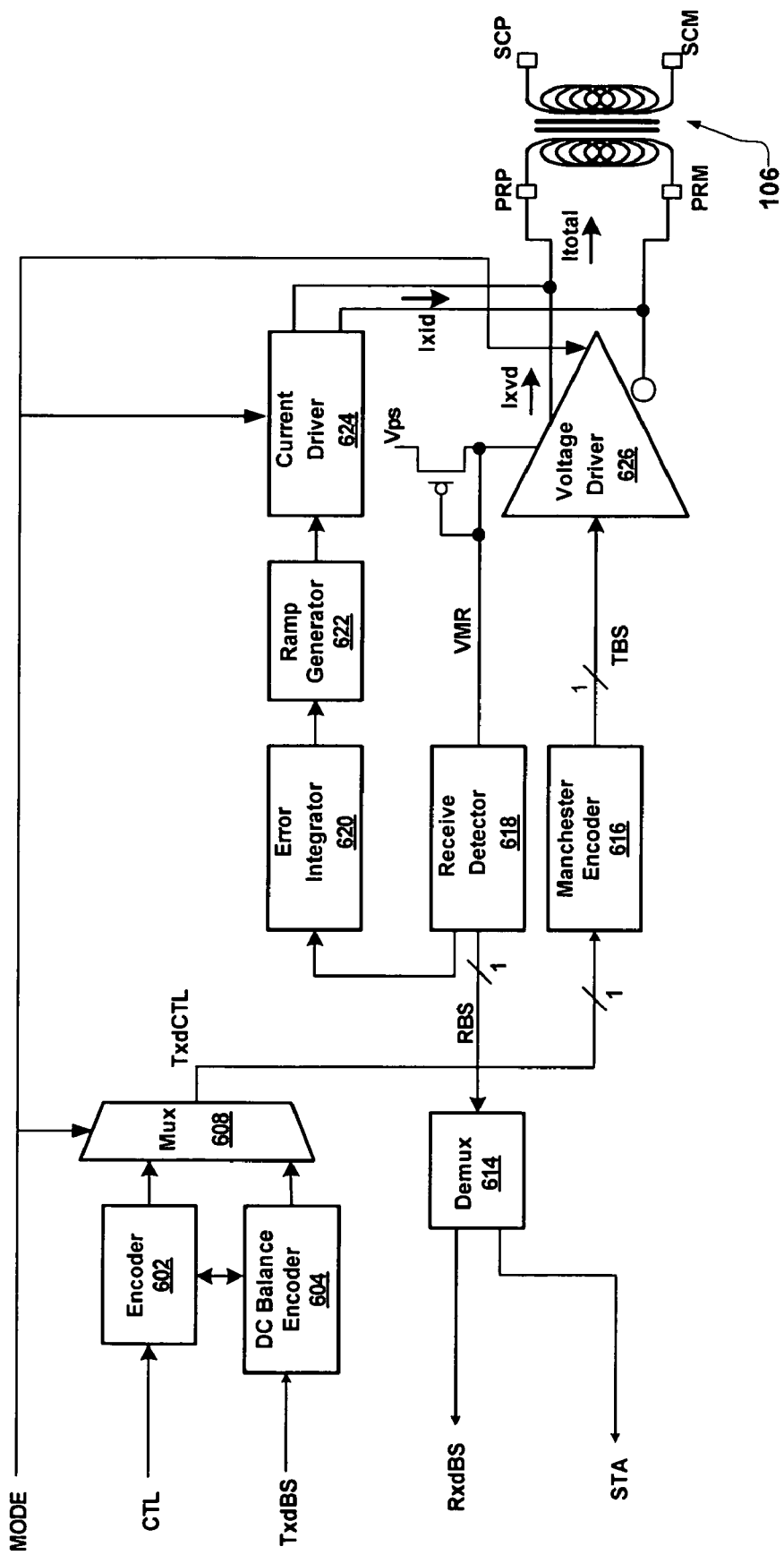
FIG. 6 is block diagram of a host side barrier interface in accordance with an embodiment of the present invention.

Now referring back to MSBI 230 of the DAA circuit example, FIG. 6 illustrates one embodiment of a Modem Side Barrier Interface. As shown, MSBI 230 may comprise Control Encoder block 602; DC Balance Encoder block (e.g., 1b/2b Manchester, etc.) 604; Multiplexer (Mux) 608; Demultiplexer (Demux) 614; Manchester Encoder 616; Receive Detector 618; Error Integrator 620; Ramp Generator 622; Current Driver 624; and Voltage Driver 626.

In this example, transmit data, TxdBS, is first DC-balance encoded (e.g. by either 3b/4b encoding and then serializing, or directly serializing via Manchester encoder) at block 604. Encoding increases the rate of the transmit data. For example, assuming the data rate of the transmit bit stream, TxdBS, is at 256 kbps, the actual data rate across the barrier, after two layers of Manchester encoding, is 256×4=1.024 Mbps or, after 3-bit to 4-bit conversion in series with Manchester encoding, 256×4/3×2=683 kbps.

In one embodiment, an AC power signal may be transmitted over the isolation barrier to LIC 108 from HIC 104 in special power frames that are time division multiplexed with data frames carrying the TxdBS data stream. The power frame may consist of, for example, enhanced magnitude voltage pulses that may be rectified and converted to a DC power source on the line side of the barrier. The power signal is doubly DC balanced at the point it is driven across the transformer, and, in one or more embodiments, may be utilized as a channel for control information.

In the embodiment of FIG. 6, composite signal CTL is the power signal modulated by control data. For example, when transfer of control data is necessary, the control data bit (i.e., CTL) may be encoded as follows: "0" may be encoded as "xx0101xx" and "1" may be encoded as "xx1010xx" in block 602, for example. The resulting encoded CTL data and TxdBS data are time-division multiplexed in Mux 608 to generate TxdCTL, which is subsequently Manchester encoded in block 616 to generate the transmit bit stream, TBS. Transmit bit stream TBS is driven across the barrier by Voltage Driver 626.

Figure 7A:
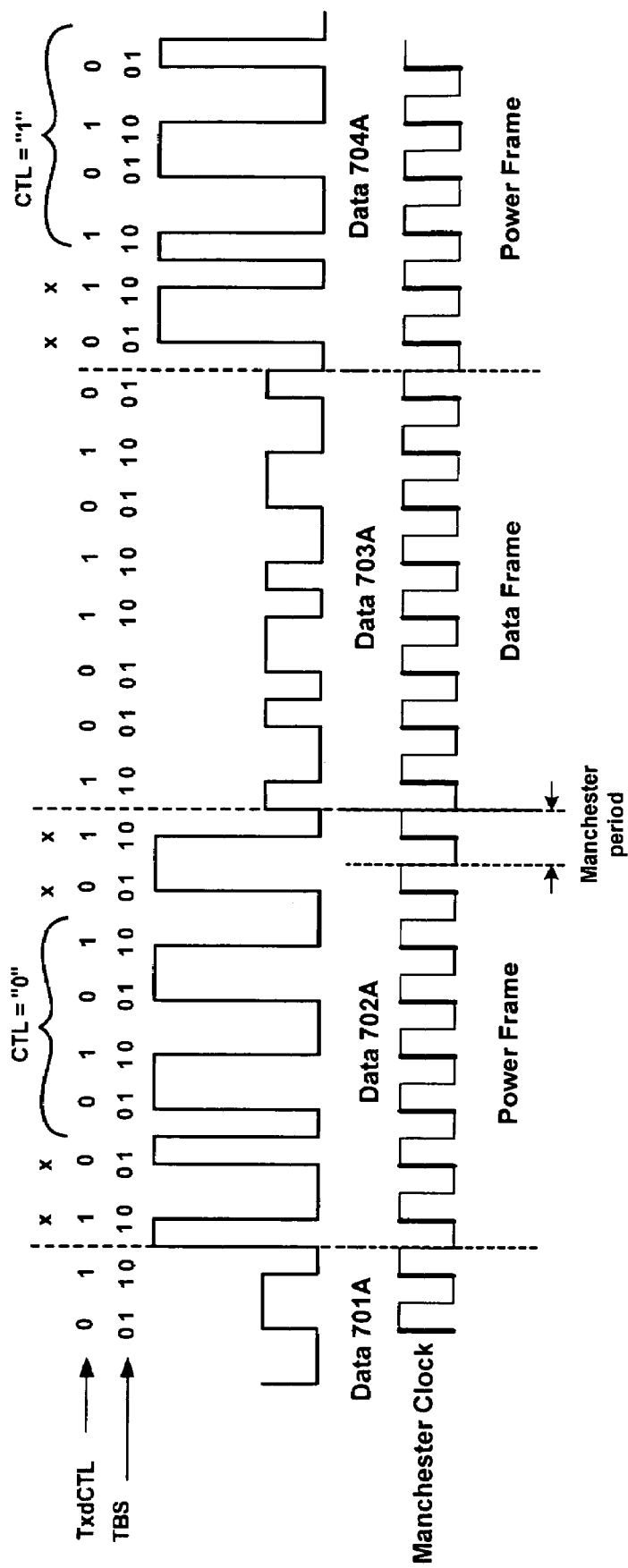
FIG. 7A is a signal diagram illustrating encoding of control and data in accordance with an embodiment of the present invention.

FIG. 7A is an illustration of encoding control and transmit data as seen across the primary side of the barrier in accordance with an embodiment of the present invention. It consists of power frames (702A and 704A) and data frames (701A and 703A). In the illustrated embodiment, each frame consists of eight Manchester periods. Each frame is thus capable of transferring four bits of raw data or eight bits of DC-balanced data (as a result of 1b/2b Manchester encoder or a 3b/4b encoder), prior to Manchester encoder 616.

Control signal, CTL, may be time-division multiplexed with the transmit bit stream (TxdBS) for transmission across the barrier to LIC 108 from the HIC 104. In a preferred embodiment, each power frame is assigned one value of CTL bit as shown in FIG. 7A. In block 602, CTL="0" may be encoded as "xx0101xx" and CTL="1" may be encoded as "xx1010xx". It should be clear to those skilled in the art that more than a single bit of CTL information may be transferred across in one power frame. The resulting encoded CTL data and TxdBS data are time-division multiplexed in Mux 608 to form the composite bit stream, TxdCTL, which is subsequently Manchester encoded in block 616 before being driven across the barrier by Voltage Driver 626. As illustrated, Data 701A represents data to be transmitted; Data 702A represents a control value of "0"; Data 703A represents data to be transmitted; and Data 704A represents a control value of "1".

As illustrated in FIG. 7A, for an embodiment using the first stage encoder is a 1b/2b encoder, one bit of control data and four raw (uncoded) transmit bits (equivalent to eight coded bits) are alternately transferred across the barrier, the effective control data transfer rate is one-fourth the rate of the transmit bit rate.

Figure 7B:
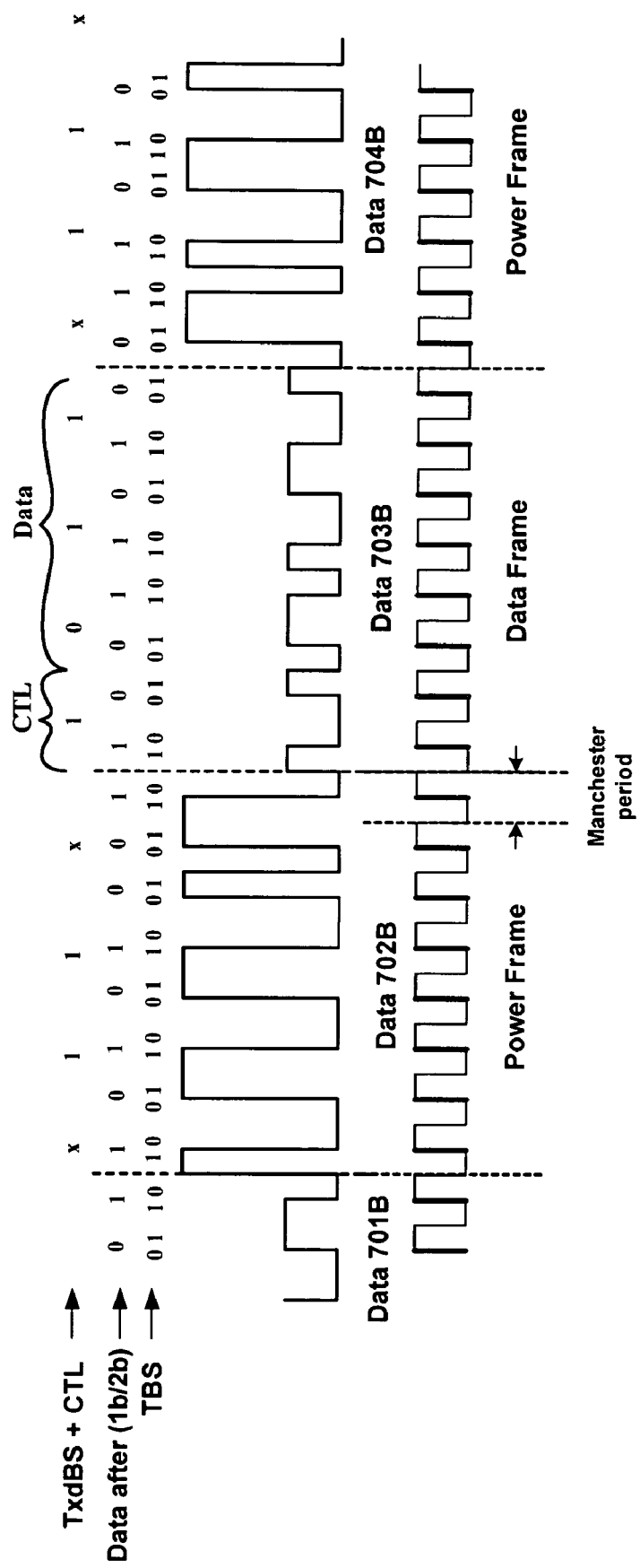
FIG. 7B is a signal diagram illustrating encoding of control and data in accordance with another embodiment of the present invention.

Alternately, FIG. 7B shows that CTL information can be embedded in the Data frame instead of the power frames if excess bandwidth exists in the transmit direction. In this embodiment, 1b/2b encoder as the first layer of encoding is used in which one bit of control data and three (uncoded) data bits are alternately transferred across the barrier. The effective control data transfer rate is one third the rate of the transmit bit rate.

Figure 17A:
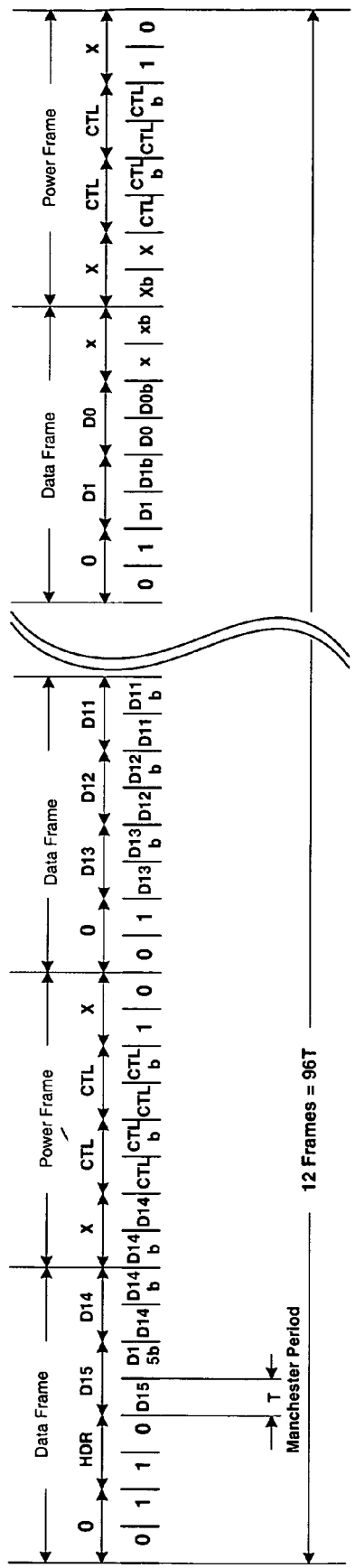
FIG. 17A is an illustration of the makeup of the transmit word in one embodiment of the present invention.

In one embodiment of the present invention, the transmit signal is doubly DC balanced using two layers of Manchester encoding prior to transmission. FIG. 17A is an illustration of the makeup of the transmit word in one embodiment of the present invention. In this illustration, the TSP 221 (see FIG. 2) serializes the 16 bit wide data (i.e. Tx_D) over six data frames (1701, 1703, . . . 1711) to generate TxdBS. The first data frame (i.e. 1701) comprises bits 15 (LSB) and 14; the second data frame (i.e. 1703) comprises bits 13, 12, and 11; the third data frame (not shown) comprises bits 10, 9, and 8; the fourth data frame (not shown) comprises bits 7, 6, and 5; the fifth data frame (not shown) comprises bits 4, 3, and 2; the last data frame (i.e. 1711) comprises bits 1 and 0.

Each data frame carries three data bits and each power frame (e.g. 1702 and 1712) carries one CTL bit. Since each data frame has four bit-slots available for data, the first bit is arbitrarily set to zero. However, other embodiments may choose to embed the CTL bit or other information in the first bit slot of the data frames. (See the illustration in FIG. 7B for the receive data). In addition, it may be necessary to delineate each word boundary by some means, for example, one header bit may be attached to each word, as illustrated in FIG. 17A. The resulting transmit serial word may then undergo the first stage of Manchester encoding to generate the signal TxdCTL.

Figure 17B:
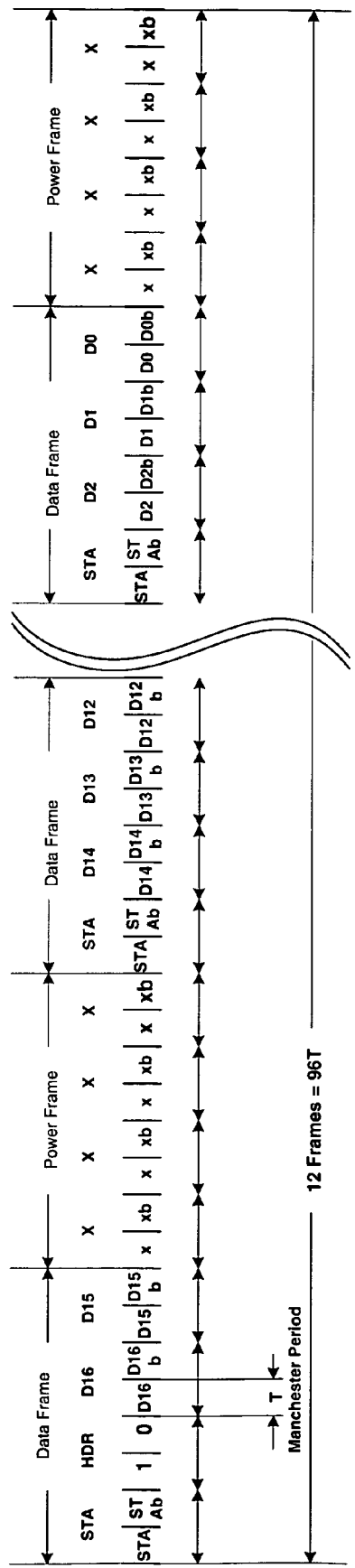
FIG. 17B is an illustration of the makeup of the receive word in one embodiment of the present invention.

In the reverse direction, the data to be sent across the barrier, RxdBS, may be formed by serializing a 17 bit wide data at 16 kHz (from ADC 908) over six data frames just as transmit data was formatted. FIG. 17B is an illustration of the makeup of the receive word in one embodiment of the present invention. As illustrated, one header bit is attached to the beginning of the 17 bit word and the resulting 18 bits are divided over the six data frames, i.e., three data bits per frame leaving one bit for STA in each of the data frames.

In this illustration, the ENDEC 1006 (see FIG. 10) serializes the 17 bit wide data (i.e. RxdBS) and a header bit over six data frames (1721, 1723, . . . 1731) as follows: the first data frame (i.e. 1721) comprises header bit, and data bits 16 (LSB) and 15; the second data frame (i.e. 1723) comprises bits 14, 13, and 12; the third data frame (not shown) comprises bits 11, 10, and 9; the fourth data frame (not shown) comprises bits 8, 7, and 6; the fifth data frame (not shown) comprises bits 5, 4, and 3; the last data frame (i.e. 1731) comprises bits 2, 1, and 0.

Thus both transmit and receive formats are very similar, simplifying the design of the barrier interface significantly.

In the preferred embodiment, each Manchester period is 1/1.536 MHz or roughly 650 nsec, and both data and power frames consist of eight Manchester periods each, or roughly 5.2 usec. Accounting for an equal number of frames for power and CTL transfer, it takes a total of twelve frames or 62.5 usec to transfer an entire word in transmit direction (six data frames to transfer a word in either direction). Since no receive data can be sent across the barrier during power frames, the transfer rate of the entire receive word is the same as that of the transmit word. Thus, so long as the transmit and receive words are generated at the same rate (at 16 kHz=1/62.5 usec.), seamless full duplex communication can be established without any need for buffering data in either direction.

Cancellation of Magnetizing Inductance Current

Referring back to FIG. 6, the receive data, RBS, may be decoded by separating the transformer current, Itotal, into two components: $I_M$, the magnetizing current; and $I_L$, the load current (i.e., due to the transformer load impedance at the secondary). In accordance with an embodiment of the present invention, a current feedback path comprising Receive Detector 618, Error Integrator 620, Ramp Generator 622, and Current Driver 624 may be implemented to generate a compensating current Ixid, which acts to cancel the magnetizing inductance current, $I_M$. The feedback loop forces Ixid to track and cancel $I_M$ so that the receive data may be detected and extracted from the load current $I_L$, which is equivalent to the sourced current Ixvd from (or sunk by) the transmit voltage driver, 626. Thus, when the loop is stabilized, Ixid will be substantially equivalent to $I_M$, and Ixvd will consist substantially of $I_L$.

Figure 8:
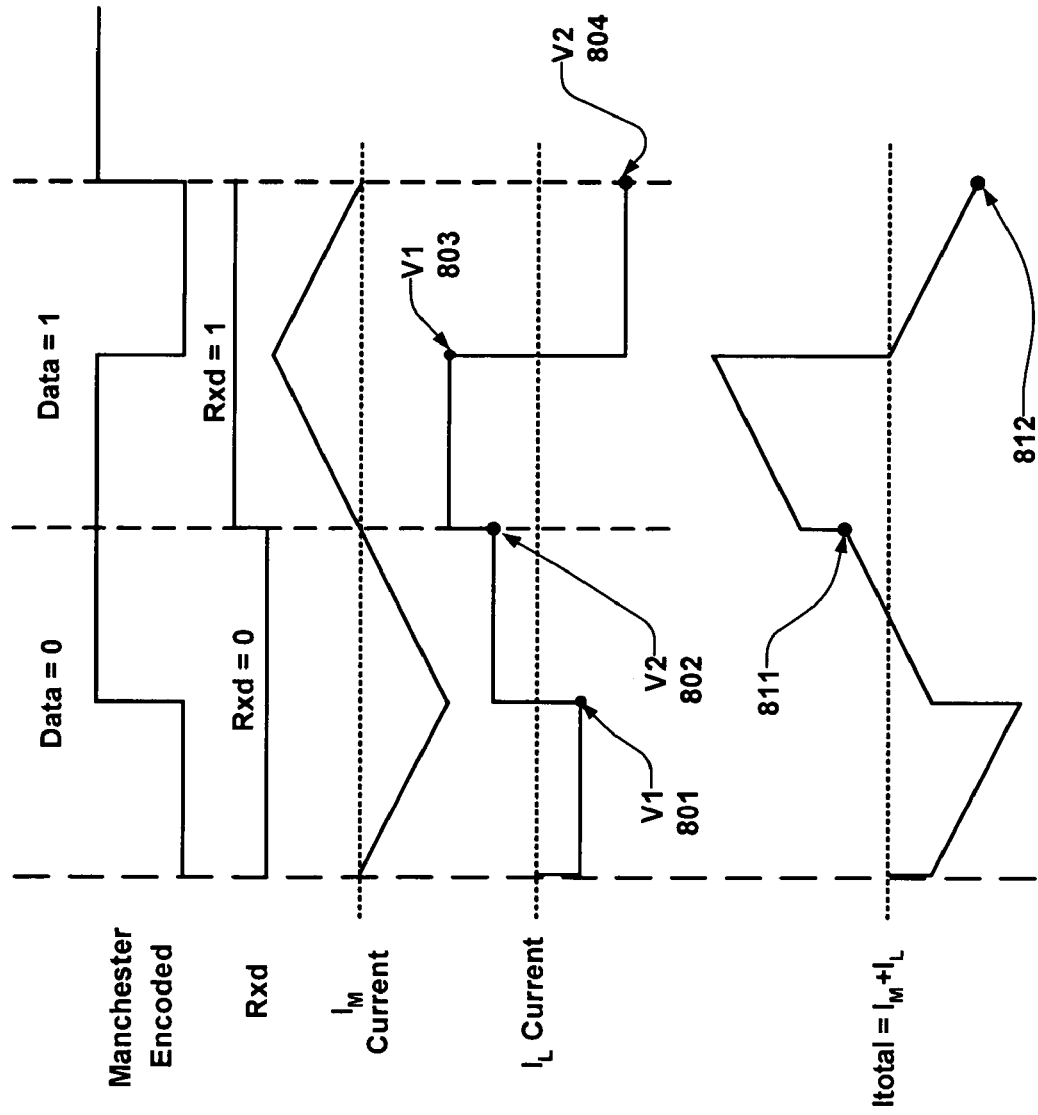
FIG. 8 is a signal diagram illustrating an example of transformer current waveforms associated with transmit and receive data signals in accordance with an embodiment of the present invention.

The digital input voltage signal comprises short spans of relatively constant voltage values, balanced around zero. Due to the integral relationship between input voltage and current in an inductor, the magnetizing inductance current, as illustrated in FIG. 8, may be characterized as a fixed-rate ramp toggling between upward and downward slopes as the input voltage signal toggles between digital (e.g., binary) voltage states. A compensating current equivalent to the magnetizing current may therefore be generated by a controllable current ramp generator.

In one embodiment, a ramp current is generated in block 622, and scaled and converted to Ixid in current driver block 624. The generated current, Ixid, feeds into the primary terminal of the transformer to cancel the magnetizing inductance current drawn by the transformer. Due to the operation of the feedback loop, current Ixid is adapted to be substantially equivalent to the magnetizing current, $I_M$, so that the current (Ixvd) sourced (or sunk) by voltage generator 626 is substantially equivalent to the isolated load current, $I_L$.

As illustrated, Receive Detector 618 decodes the receive data and generates the loop error discriminant from signal VMR. Signal VMR, in one embodiment, is a voltage signal that is generated by forcing the rectified value of current Ixvd (i.e., |Ixvd|) of the voltage driver thru a diode connected PMOS device. VMR can then be conveniently used in a current mirror configuration to regenerate error current within Error Integrator 620 for further processing.

The receive detector (i.e. 618) may comprise a load current processing circuit and a threshold detector, for example. Thus, an embodiment may use a simple logic of setting the receive data to zero ("0") when the load current is below a known threshold, otherwise the receive data is set to one ("1"). In an embodiment of the present invention, the receive data, as shown in FIG. 12B, may be differentially encoded such that it (the receive data) may be received at the primary by differentially detecting the load currents. More specifically, since each raw data bit is encoded into two Manchester periods, the load current may be rectified and then integrated over the first Manchester period and also over the second Manchester period. The receive data is obtained by comparing the two integrated values.

Example input voltage waveforms for transmit data (Manchester encoded), and corresponding waveforms for currents $I_M$, $I_L$ and Itotal are shown in FIG. 8. VMR can be sampled at two different times to form an error discriminant. Since $I_M$ is known to be ideally zero at the end of the Manchester period (V2—802, 804 in FIG. 8) and at its maximum in the middle of the Manchester period (V1—801, 803 in FIG. 8), VMR (that represents |Ixvd|) is sampled at those two instances, in one embodiment. Any difference that exists between the two samples represents a portion of magnetizing current $I_M$ that is not cancelled by the Ixid of the current driver 624, resulting in an error signal around which the servo loop may be closed to achieve Ixvd=$I_L$.

When the error signal into integrator 620 averages to zero, the integrator output is constant. This constant output may form the input basis for ramp generator 622. For instance, a constant current source, when integrated, results in a ramped current output. The generated current ramp from Ramp Generator 622 may subsequently feed into Current Driver 624 (e.g., a high impedance driver), which drives the current, Ixid, into the primary of the transformer.

Thus, a feedback loop comprising an error (receive) detector 618, error integrator 620, ramp generator 622, and current driver 624 is used, in one embodiment, for cancellation of the magnetizing inductance current, $I_M$. The voltage driver sources (or sinks) the isolated load current equivalent.

After decoding, the receive signal RBS is separated (e.g. demultiplexed) into data and status information in Demux 614. The data portion may comprise six bits, for example, which may subsequently be serialized into the receive bit stream, RxdBS. In addition, the status bit STA may be used to form an 8-bit wide status word.

In one embodiment, LSBI 902 identifies the state of operation by monitoring the transmit data stream, TBS, coming across the barrier from HIC 104 by checking the number of power pulses and the data pulses or by checking voltage levels of the transmit data stream (e.g., power pulses may be transmitted with a higher voltage than data pulses). For instance, the modes of operation may comprise a mixed mode and a data mode.

In Mixed mode, power transmission and full-duplex data transfer may proceed as previously described.

In Data mode, transmit and receive data may be simultaneously and continuously exchanged between the LIC 108 and HIC 104 at twice the rate of Mixed mode as the power frames can now be used as data frames.

Line Side Barrier Interface

Figure 10:
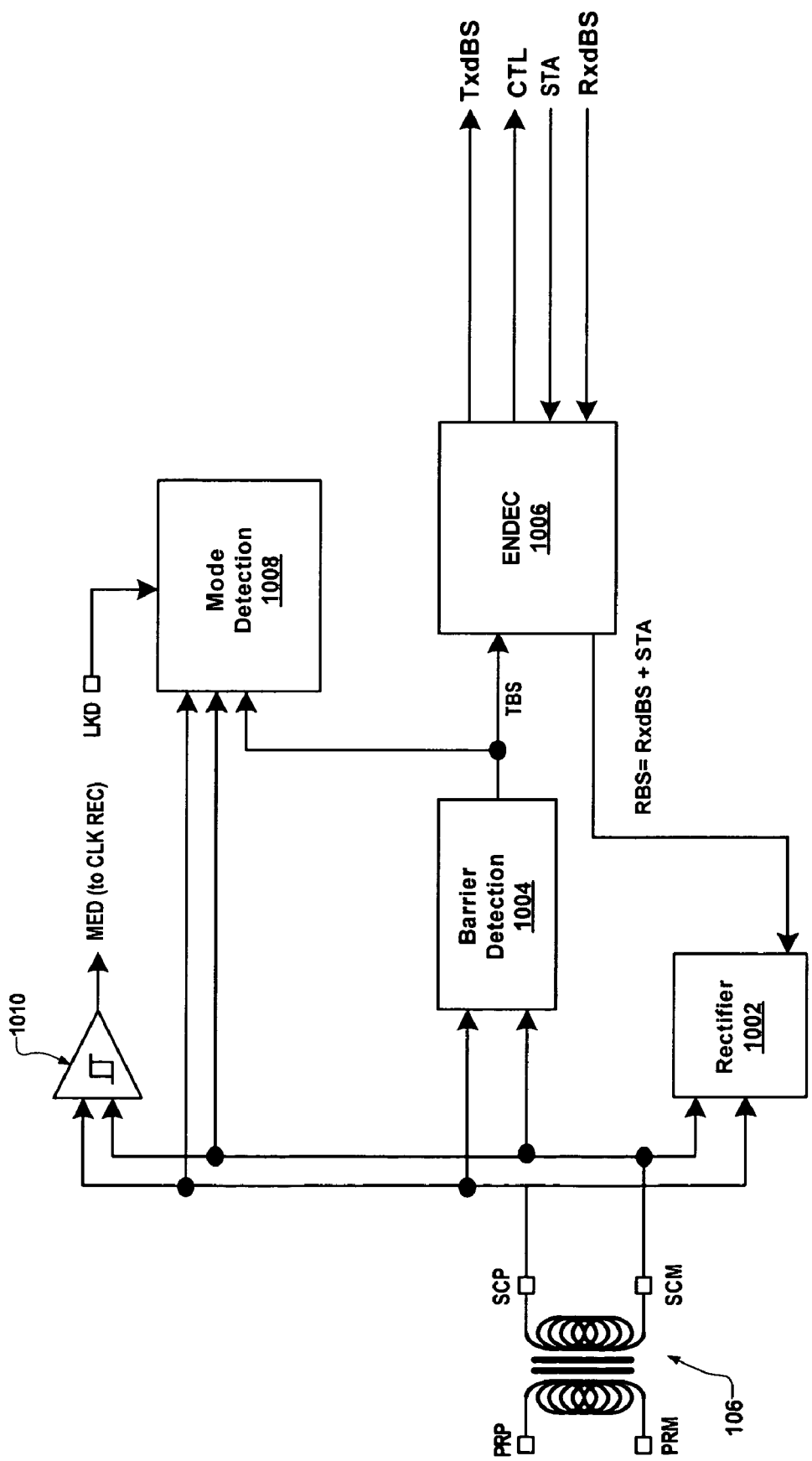
FIG. 10 is a block diagram of a line side barrier interface in accordance with an embodiment of the present invention.

FIG. 10 is a functional illustration of an embodiment of a Line Side Barrier Interface (LSBI) 902. As illustrated, LSBI 902 comprises Rectifier 1002; Barrier Detection 1004; Encoder/Decoder (ENDEC) 1006; Mode Detection 1008; and amplifier/comparator 1010. Comparator 1010 generates and sends the transmitted Manchester Encoded Data (MED) to the clock recovery loop. MED may be raw data from the barrier or processed data generated in accordance with the illustration of FIG. 15B to ease the task of clock recovery, depending on the state of the clock recovery loop.

Figure 11A:
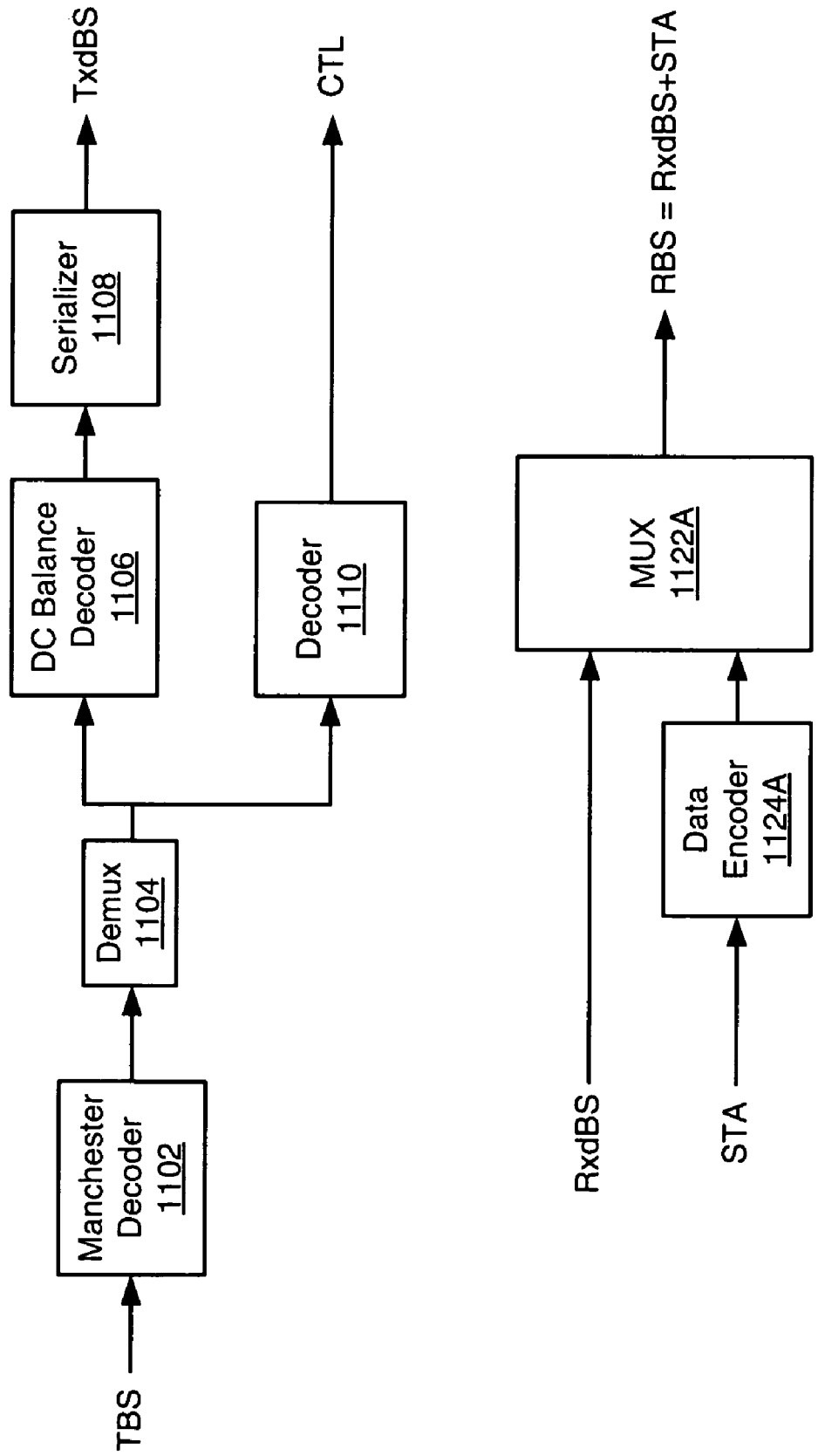
FIG. 11A is a block diagram of an encoder/decoder in accordance with an embodiment of the present invention.
Figure 11B:
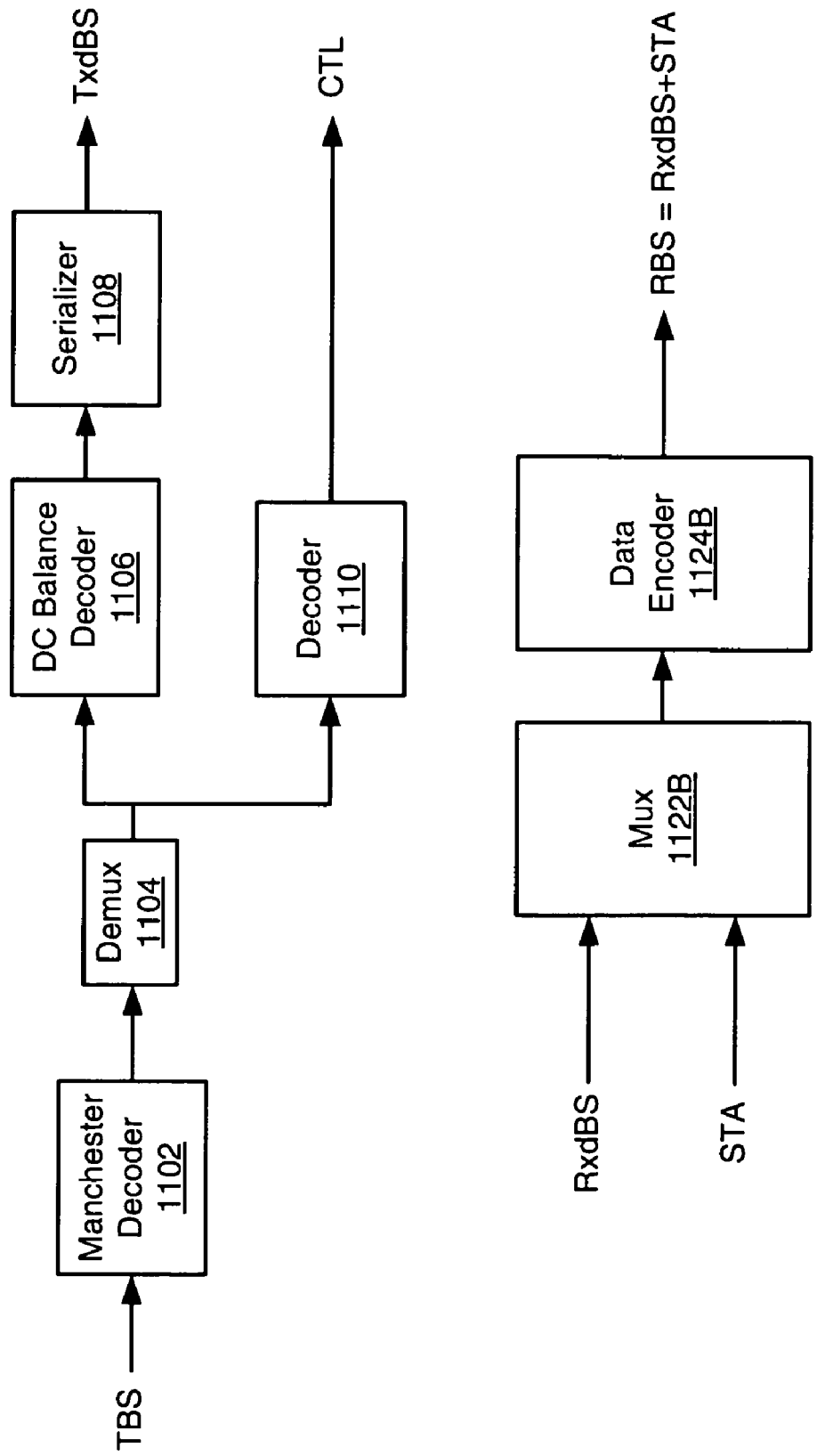
FIG. 11B is a block diagram of an encoder/decoder in accordance with another embodiment of the present invention.

Encoder/Decoder (ENDEC) 1006 performs decoding of the transmit bit stream (TBS) into CTL and TxdBS and performs the reverse of DC Balance Coding performed in 604. That is, the ENDEC 1006 recovers TxdBS (see FIG. 6) on the Line Side. FIGS. 11A and 11B are functional illustrations of Encoder/Decoder 1006 in accordance with embodiments of the present invention.

As illustrated in both FIGS. 11A and 11B, transmit bit stream, TBS, is Manchester decoded in block 1102 and then demultiplexed in block 1104 into a data portion and a control portion. The data portion is processed through a DC Balance Decoder (reverse of DC Balance Encoder discussed with respect to FIG. 5) in block 1106. The resulting data may be serialized in block 1108 into the recovered transmit bit stream, TxdBS. In addition, the control portion is decoded in block 1110 to generate the control bit, CTL.

Encoder/Decoder 1006 also encodes the receive data, RxdBS, which originates from Analog to Digital Converter (ADC) 908, and the status bit, STA, to generate the composite signal RBS (=RxdBS+STA). In blocks 1122 and 1124, the receive data, RxdBS, and the Status bit, STA, may be encoded for transmission across the barrier.

Referring to the embodiment of FIG. 11A, the status bit, STA, may be Manchester encoded in block 1124A and then combined with the uncoded receive bit stream, RxdBS, in block 1122A to form RBS, which is illustrated in FIG. 12A as "Encoded Rxdata". In this embodiment, the encoding scheme first does Manchester encoding of the Status bit into two bits in block 1124A and places one of the bits at the beginning of three of six bits of data and the other at the beginning of the remaining three of the same six data bits in block 1122A. The resulting bit pattern is further illustrated graphically in FIG. 12A. In this embodiment, special encoding of the RxdBS bits is not required and thus not shown. Also, note that a status bit of "0" is encoded in both the illustrations of FIGS. 12A and 12B. In contrast, if the status bit is "1" (i.e. STA=1), the encoded data would have its bit pattern reversed. That is, a "1" in the first position of the status bit and a value of "0" in the second position of the status bit.

In another embodiment illustrated in FIG. 11B, both the status bit (STA) and the receive data bit stream (RxdBS) are multiplexed in block 1122B and then Manchester encoded within block 1124B to generate the receive bit stream, RBS. The resulting bit pattern is illustrated in FIG. 12B.

The formed received bit stream (i.e. RBS) is then transmitted to the HIC. When HIC 104 detects the RBS, it frames the bits and decodes the data accordingly into RxdBS and STA. Thus, for instance into seven bits of data—six bits of receive data, RxdBS, and one bit of STA, if the RBS was formed in the LIC using the embodiment illustrated in FIG. 11A. Also, the data may be decoded into three bits of RxdBS and one bit of STA if RBS was formed in the LIC using the embodiment illustrated in FIG. 11B.

Synchronization of LIC and HIC

Full duplex communication across the barrier is preferably performed when the HIC and the LIC are substantially locked in time (synchronized). For example, switch Rxd 302 in FIG. 3A is preferably opened and closed at the beginning or the end of the Manchester period to enable proper decoding of data on either side of the barrier. In other words Manchester edges in the HIC should line up closely with those of the LIC. One way to achieve synchronous operation is to use the same clock on both sides of the barrier. Thus, one or more embodiments of the present invention provide circuits on the secondary side to recover the clock used in the primary side (i.e. host side) to encode the transmitted data. The recovered clock is subsequently used as the master clock for appropriate functions on the secondary side.

Figure 13:
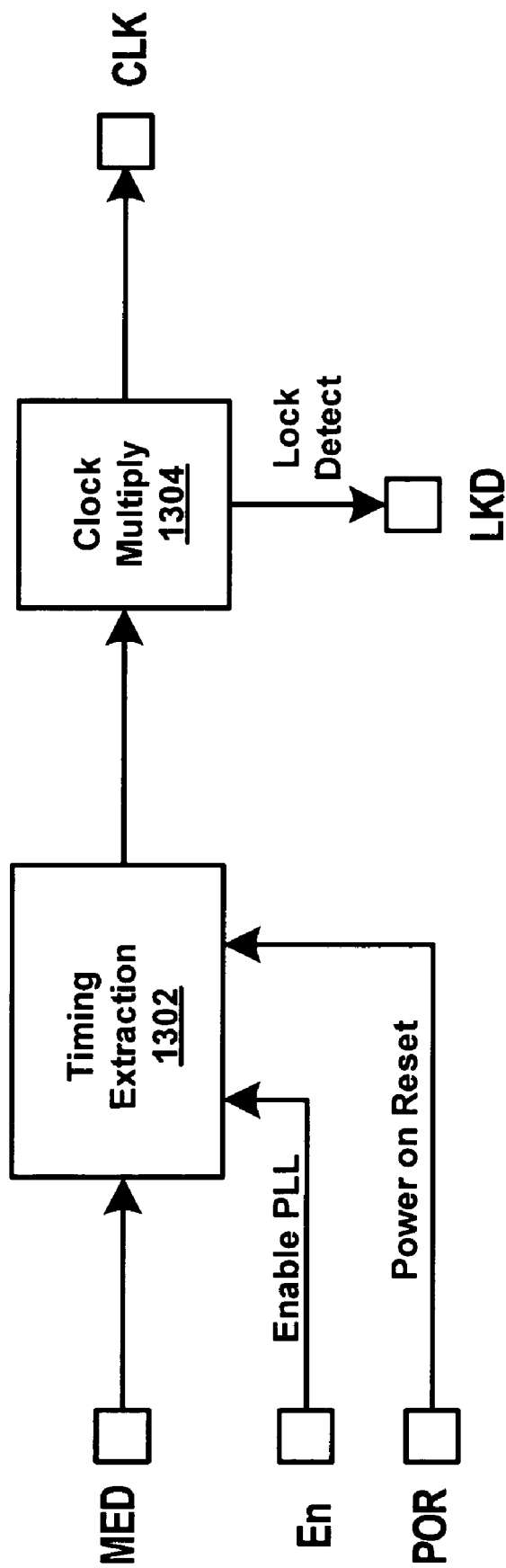
FIG. 13 is a block diagram of a clock recovery circuit in accordance with an embodiment of the present invention.

FIG. 13 is an illustration of a clock recovery circuit in accordance with an embodiment of the present invention. As illustrated, clock recovery in the LIC 108 may be performed by a Phase Lock Loop (PLL) comprising a timing extraction block 1302 and a clock multiply block 1304. Upon enablement, timing extraction block 1302 sets up the Phase Lock Loop and determines the frequency of the input signal, MED (i.e. Manchester Encoded Data). The output frequency of the timing extraction block 1302 is subsequently multiplied by clock multiplier 1304 to generate the Manchester clock, CLK, of the transmit signal. In addition, after the PLL locks onto MED, the input frequency, the signal LKD is asserted indicating to LSBI 902 that the Manchester clock has been acquired.

The range of frequency associated with the input signal, MED, may vary significantly. Thus, the clock recovery circuit is preferably configured to handle a wide frequency range.

Figure 15A:
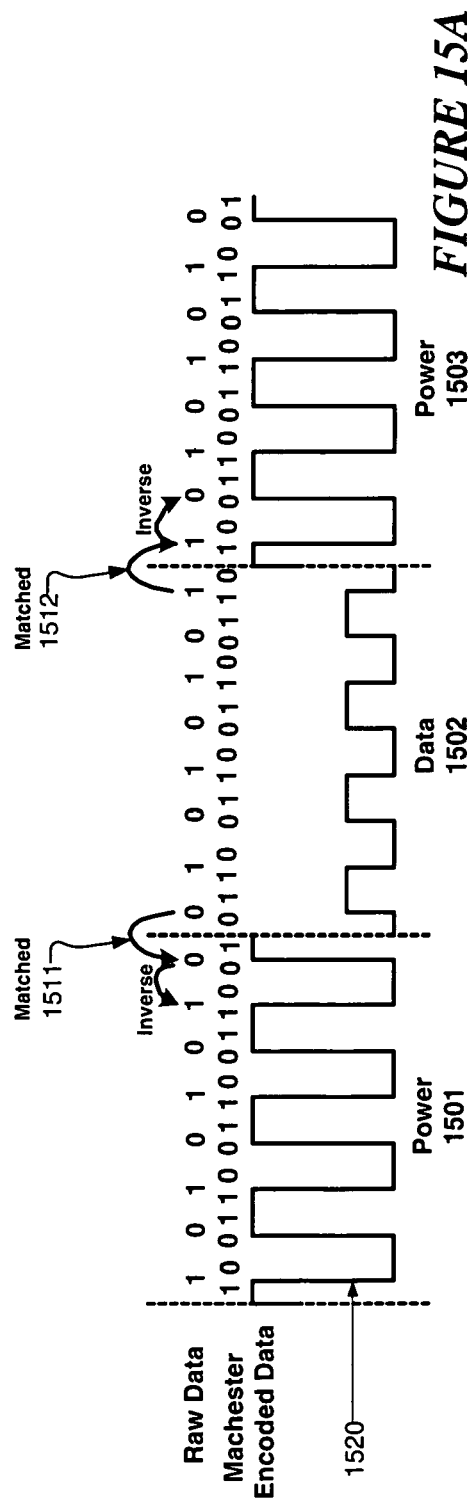
FIG. 15A is a signal diagram illustrating representative preamble pulses for clock recovery lock in accordance with an embodiment of the present invention.

To set up the clock recovery circuit, the HIC 104 may send a preamble containing only clock and power pulses as shown in FIG. 15A. There can be an irregularity in the waveform at the boundaries between power and data frames. The transformer driver for power and data frames may be configured such that the Manchester codes saddling the boundaries between power and data frames are matched. In addition, transmissions of a dual mode signal with significantly different power levels for each mode may be achieved using a dual mode super source follower circuit, for example.

Figure 15B:
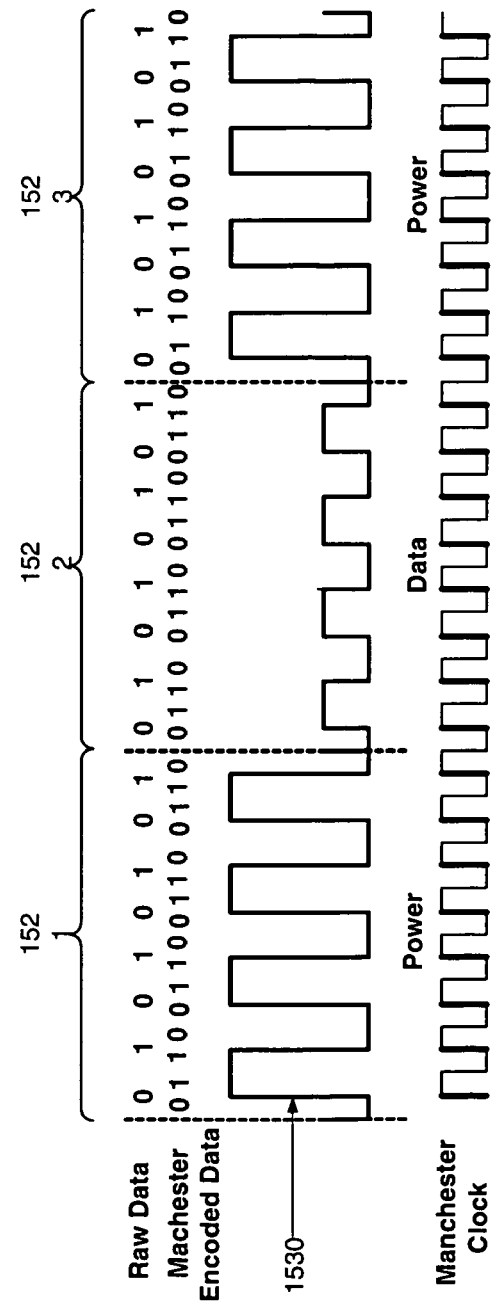
FIG. 15B is a signal diagram illustrating results of inversion of the preamble pulses for clock recovery in accordance with an embodiment of the present invention.

As illustrated in FIG. 15B, LSBI 902 first inverts the power pulses to create a true alternating signal. After inversion, the resulting pulse train becomes a seamless preamble pattern at half the frequency of the Manchester clock, i.e. transitions only occur at the rising edge of the Manchester clock. This makes the initial locking process relatively easy. For instance, the Timing Extraction circuit 1302 may be configured to automatically detect the approximate frequency of the inverted preamble and use that information to properly set parameters of a PLL.

Figure 14:
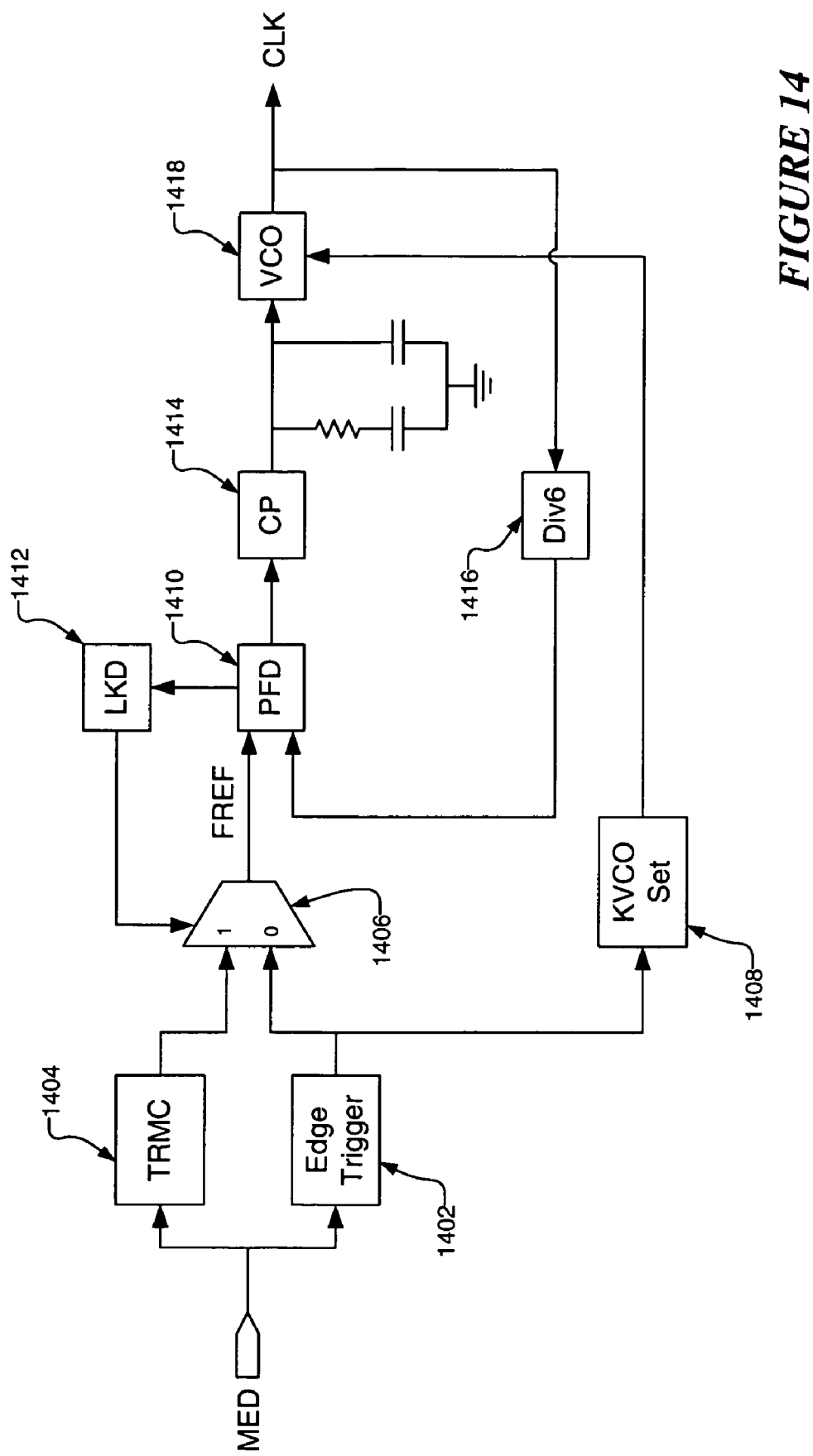
FIG. 14 is a block diagram of a phase-locked loop for clock recovery in accordance with an embodiment of the present invention.

FIG. 14 is a detailed illustration of a PLL for clock recovery in accordance with an embodiment of the present invention. The clock recovery PLL comprises an edge trigger block 1402; Timing Recovery Manchester Encoder block (TRMC) 1404; switch 1406; phase detector (PFD) 1410; voltage controlled oscillator gain determination block (KVCO Set) 1408; lock determination block (LKD) 1412; voltage controlled oscillator (VCO) 1418; clock divider block (Div6) 1416; and Charge Pump (CP) 1414.

Edge trigger block 1402 may be implemented as a one-shot circuit, to provide a one-shot pulse for every edge in the MED preamble. TRMC 1404 also provides a pulse output based on transitions in the MED signal, however, TRMC 1404 is configured for use after phase lock is achieved, i.e., for real data rather than uniform preamble data. As such, TRMC 1404 selects only valid transitions in the MED data stream that occur at the Manchester clock rate. Multiplexer 1406 provides the signal FREF to phase detector 1410, as the reference signal to which the PLL locks in phase and frequency. Multiplexer 1406 is controlled by lock detection block 1412 to channel the pulse output of edge trigger block 1402 to phase detector 1410 during the locking process, and to channel the pulse output of TRMC 1404 to phase detector 1410 after lock is achieved. Lock detection block 1412 is coupled to phase detector 1410 to determine when the PLL has achieved satisfactory lock, e.g., when the phase error from detector 1410 is within a specified limit for a specified amount of time.

The phase error from phase detector 1410 is provided to charge pump 1414, which incrementally drives charge onto or removes charge from a capacitor of a low pass filter based on the direction of the phase error signal. The stored charge at the output of charge pump 1414 provides the control voltage for voltage controlled oscillator 1418 to vary the output frequency of VCO 1418 up or down based on whether the PLL is leading or lagging behind signal FREF. The output of VCO 1418 provides the output clock signal of the PLL. In addition, the output of VCO 1418 is scaled in frequency at block 1416 before being fed back to phase detector 1410 for comparison with FREF. In the illustrated embodiment, the VCO feedback signal is divided by six, which means that the CLK output from VCO 1418 locks in phase to FREF at six times the frequency of FREF. Of course, embodiments of the invention may implement other frequency scale factors as well.

In one or more embodiments of the invention, VCO 1418 is configured with one or more gain settings to specify a base operating frequency, in addition to the control parameter (e.g., voltage input from CP 1414) varying the VCO output frequency around the base operating frequency. In other embodiments, the oscillator may be implemented with variable control parameters other than or in addition to voltage (e.g., current-controlled, numerically controlled, etc.). The combination of coarse frequency control via the gain settings and fine frequency control via the variable (voltage) control input permits the VCO (and hence the PLL) to operate efficiently over a wide range of frequencies.

KVCO set block 1408 in FIG. 14 is coupled to VCO 1418 to provide initial gain settings (e.g., as control bits) to VCO 1418 when the PLL is activated. Using the one-shot pulses from edge trigger block 1402, KVCO set block 1408 estimates the frequency of the MED data and provides gain settings to VCO 1418 to establish the operating range of the VCO in the vicinity of the estimated frequency of the MED data (or a scaled value of that estimate).

In one embodiment of the clock recovery circuit, the process of acquiring a clock (CLK) that is locked to Manchester Encoded Data comprises the following three steps. The first step is to estimate the required KVCO gain settings (KVCO 1408) for the PLL for a given input clock (preamble) represented by the input signal, MED. This may be accomplished by enabling KVCO counters in the clock extraction block to start counting MED edges for a specific period.

For instance, both edges of MED may be counted for a predetermined period of time by charging an on-chip capacitor with an on-chip constant current source until a threshold is reached. Both the threshold and the current source can be derived from a bandgap based reference that may be available on chip. One such embodiment is illustrated in FIGS. 16A and 16B.

Figure 16A:
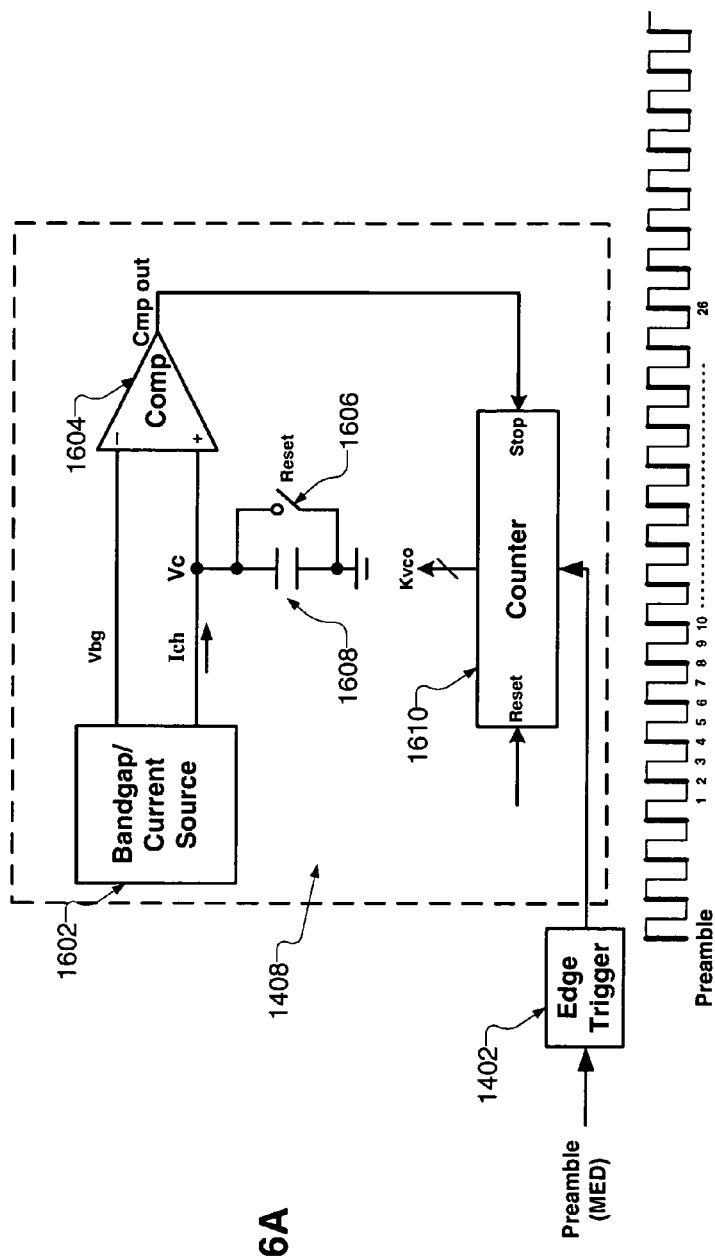
FIG. 16A is a block diagram illustration of a circuit for estimating phase lock loop parameters in accordance with an embodiment of the present invention.
Figure 16B:
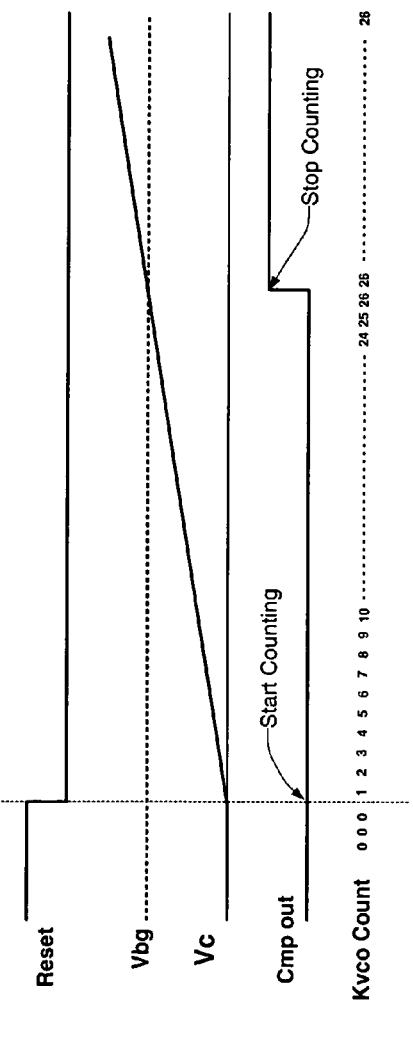
FIG. 16B illustrates the time line associated with FIG. 16A.

FIG. 16A is an illustration of block Kvco Set 1408 in an embodiment of the present invention. As illustrated, bandgap current source 1602 provides reference bandgap voltage Vbg to comparator 1604 and constant current Ich for charging capacitor 1608. Switch 1606 provides bypass of capacitor 1608 to ground for current Ich, and counter 1610 provides the Kvco gain based upon the number of edges counted while capacitor 1608 is charging.

In operation, each edge of the preamble generates a pulse from Edge Trigger 1402 which feeds into counter 1610. When Reset is True, the output of counter 1610 (i.e., Kvco) and voltage Vc are equal to zero. Thus, the output of comparator 1604 (i.e., Cmp out) is False. However, when Reset goes False, switch 1606 closes and current Ich starts to charge capacitor 1608 so that voltage Vc moves towards Vbg; while counter 1610 increments Kvco from zero, for example, by counting the pulses from Edge trigger 1402. When Vc reaches Vbg, the comparator output (i.e., "Cmp out") goes to True which causes counter 1610 to stop counting.

Because the charging current, capacitor value and threshold voltage are known, the time interval for the capacitor to charge up to the threshold voltage value is also a known quantity. The raw count value of edges occurring during this known interval thus provides a metric for estimating the clock frequency of the transmitted data. Performance of the PLL is improved, in one or more embodiments, by pre-tuning the frequency range of the PLL around the estimated clock frequency, e.g., by setting initial gain control bits of VCO 1418.

After counting is complete, the entire PLL is powered up and the final results of the counters are used to set the KVCO control bits. Initially, the generated double input frequency signal at block 1402 (i.e., edge triggered pulses) may be used as the reference frequency (FREF) to the PLL.

Second, after setting the PLL KVCO control bits and powering up the entire PLL, the PLL begins the process of locking to MED (still preamble). When the PLL has successfully acquired lock, the signal LKD goes high in block 1412.

Third, once signal LKD goes high, the reference frequency input (FREF) to the PLL may switch from the output of the bi-directional one-shot (i.e., Edge Trigger 1402) to the output of Timing Recovery Manchester Encoder block (TRMC) 1404, which selects only the valid Manchester transition edges present at the constant rate of the Manchester clock. This switching should occur smoothly. In addition, assertion of the signal LKD may also be an indication to the primary side circuitry that it can start sending data instead of preamble clock to the MED.

CLK may be conveniently multiplied up from the Manchester clock rate, e.g., six times. Note the rising edge of the recovered Manchester clock is aligned with valid data transitions. The recovered clock signal may then be used in all circuitry on the line side requiring timing information. With the impedance modulation of the secondary synchronized with the voltage modulation of the primary, the circuitry on the primary side of the transformer is better able to detect the receive data from the load current flowing into/out of the primary.

Thus, a method and apparatus for synchronizing the secondary side and primary side of transformer circuit for full duplex communication have been described. Particular embodiments described herein are illustrative only and should not limit the present invention thereby. The invention is defined by the claims and their full scope of equivalents.

The invention claimed is:

1. An apparatus for synchronizing both sides of a transformer circuit for full duplex communication comprising:
    a transformer isolation barrier having a primary side and a secondary side;
    a first circuit coupled to said primary side of said transformer, said first circuit configured to communicate a transmit bit stream at a clock frequency from said primary side to said secondary side; and
    a second circuit coupled to said secondary side of said transformer configured to receive said transmit bit stream, wherein said second circuit comprises an automatically configurable clock recovery circuit configured to determine said clock frequency, said transmit bit stream comprising a preamble sequence during said recovery of said clock frequency; said clock recovery circuit comprising:
    a phase lock loop having a variable gain voltage controlled oscillator, wherein said phase lock loop has a reference frequency input and said clock frequency as output; and
    a circuit configured to determine said gain of said voltage controlled oscillator by counting transition edges in said transmit bit stream comprising:
    a bandgap circuit generating a reference voltage and a reference current;
    a capacitor circuit coupled to said reference current and to ground;
    a comparator circuit coupled to said reference voltage in one input terminal and to said capacitor in a second input terminal; and
    a counter having an output equivalent to said gain, said counter coupled to an output of said comparator circuit and to said transmit bit stream, wherein said counter counts edges in said transmit bit stream until assertion of said output of said comparator circuit.

2. The apparatus of claim 1, wherein said transmit bit stream is double DC Balance encoded.

3. The apparatus of claim 1, wherein said clock recovery circuit comprises a reference frequency generator using said transmit bit stream to generate said reference frequency input.

4. The apparatus of claim 3, wherein said reference frequency generator comprises:
    a selector circuit having a plurality of input terminals and an output terminal, said output terminal coupled to said reference frequency input of said phase lock loop, wherein said selector circuit is configured to connect an appropriate one of said plurality of input terminals to said output terminal based upon a value of a selector signal;
    an edge trigger circuit having an input coupled to said transmit bit stream and an output coupled to a first terminal of said plurality of input terminals of said selector circuit;
    a timing recovery circuit having an input coupled to said transmit bit stream and an output coupled to a second terminal of said plurality of input terminals of said selector circuit, wherein said output of said timing recovery circuit is in response to valid edges in said transmit bit stream; and
    a circuit generating said selector signal, wherein said selector signal has a value to cause said selector circuit to select said edge trigger circuit during said recovery of said clock frequency and a value to cause said selector circuit to select said timing recovery circuit after said recovery of said clock frequency.

5. A method for synchronizing both sides of a transformer circuit for full duplex communication comprising:
    generating a transmit bit stream at a clock frequency on a primary side of transformer isolation barrier, said transformer isolation barrier having said primary side and a secondary side;
    communicating said transmit bit stream from said primary side to said secondary side; and
    recovering said clock frequency on said secondary side from said transmit bit stream using an automatically configurable clock recovery circuit by generating said clock frequency as output of a phase lock loop having a variable gain voltage controlled oscillator, wherein said phase lock loop has a reference frequency as input, and determining said variable gain of said voltage controlled oscillator by counting transition edges in said transmit bit stream by generating a counter value by counting edges of said preamble sequence for a predetermined period and determining said gain from said counter value, said transmit bit stream comprising a preamble sequence during said recovery of said clock frequency.

6. The method of claim 5, wherein said transmit bit stream is double DC Balance encoded.

7. The method of claim 5, wherein said reference frequency is generated from said transmit bit stream.

8. The method of claim 7, wherein said transmit bit stream comprises data frames and power frames.

9. The method of claim 8, wherein generating said reference frequency comprises:
- generating a preamble sequence signal from said transmit bit stream by inverting said power frames;
- processing said preamble sequence signal through an edge triggered circuit to generate said reference frequency prior to obtaining a lock of said clock frequency; and
- processing said transmit bit stream through a timing recovery circuit to generate said reference frequency after obtaining a lock of said clock frequency.

* * * * *